United States Patent
Paulsen et al.

(10) Patent No.: US 9,614,226 B2
(45) Date of Patent: Apr. 4, 2017

(54) DOUBLE-SHELL CORE LITHIUM NICKEL MANGANESE COBALT OXIDES

(75) Inventors: Jens Paulsen, Daejeon (KR); Randy De Palma, Maasmechelen (BE); HeonPyo Hong, BaekSeokDong (KR); KyuBo Kim, Jangan-Gu (KR)

(73) Assignee: Umicore, Brussels (BE)

( * ) Notice: Subject to any disclaimer, the term of this patent is extended or adjusted under 35 U.S.C. 154(b) by 0 days.

(21) Appl. No.: 13/505,582

(22) PCT Filed: Oct. 19, 2010

(86) PCT No.: PCT/EP2010/006351
§ 371 (c)(1),
(2), (4) Date: Jul. 2, 2012

(87) PCT Pub. No.: WO2011/054440
PCT Pub. Date: May 12, 2011

(65) Prior Publication Data
US 2012/0270104 A1 Oct. 25, 2012

Related U.S. Application Data

(60) Provisional application No. 61/258,635, filed on Nov. 6, 2009.

(30) Foreign Application Priority Data

Nov. 5, 2009 (EP) .................................... 09013886
Jun. 3, 2010 (EP) .................................... 10005780

(51) Int. Cl.
*H01M 4/62* (2006.01)
*H01M 4/131* (2010.01)
(Continued)

(52) U.S. Cl.
CPC ............. *H01M 4/62* (2013.01); *H01M 4/131* (2013.01); *H01M 4/1391* (2013.01);
(Continued)

(58) Field of Classification Search
CPC .... H01M 4/131; H01M 4/1391; H01M 4/366; H01M 4/62; H01M 4/525;
(Continued)

(56) References Cited

U.S. PATENT DOCUMENTS 5,514,492 A 5/1996 Marincic et al.
5,968,683 A 10/1999 Kolb
(Continued)

FOREIGN PATENT DOCUMENTS

CN 101147283 A 3/2008
CN 101156260 A 4/2008
(Continued)

OTHER PUBLICATIONS

Machine translation of JP2001313034A.*
(Continued)

*Primary Examiner* — Stephen Yanchuk
(74) *Attorney, Agent, or Firm* — Brinks Gilson & Lione

(57) ABSTRACT

A lithium transition metal oxide powder for use in a rechargeable battery is disclosed, where the surface of the primary particles of said powder is coated with a first inner and a second outer layer, the second outer layer comprising a fluorine-containing polymer, and the first inner layer consisting of a reaction product of the fluorine-containing polymer and the primary particle surface. An example of this reaction product is LiF, where the lithium originates from the primary particles surface. Also as an example, the fluorine-containing polymer is either one of PVDF, PVDF-HFP or PTFE.

19 Claims, 17 Drawing Sheets

(51) Int. Cl.
  *H01M 4/1391* (2010.01)
  *H01M 4/36* (2006.01)
  *H01M 4/525* (2010.01)
  *H01M 4/13915* (2010.01)
  *H01M 4/1315* (2010.01)
  *H01M 10/052* (2010.01)

(52) U.S. Cl.
  CPC .......... *H01M 4/366* (2013.01); *H01M 4/525* (2013.01); *H01M 4/623* (2013.01); *H01M 4/1315* (2013.01); *H01M 4/13915* (2013.01); *H01M 10/052* (2013.01); *Y02E 60/122* (2013.01)

(58) Field of Classification Search
  CPC ............. H01M 10/052; H01M 4/1315; H01M 4/13915; H01M 4/623; Y02E 60/122
  See application file for complete search history.

(56) References Cited

U.S. PATENT DOCUMENTS

| | | | |
|---|---|---|---|
| 6,835,492 | B2 | 12/2004 | Cho et al. |
| 2003/0027046 | A1 | 2/2003 | Hosokawa et al. |
| 2003/0215716 | A1 | 11/2003 | Suzuki et al. |
| 2008/0254368 | A1 | 10/2008 | Ooyama et al. |
| 2009/0087362 | A1 | 4/2009 | Sun et al. |
| 2009/0087740 | A1 | 4/2009 | Deguchi et al. |
| 2009/0104532 | A1* | 4/2009 | Hosoya ................. H01M 4/366 429/224 |
| 2009/0191460 | A1* | 7/2009 | Fujiwara et al. ............ 429/209 |
| 2009/0194747 | A1 | 8/2009 | Zou et al. |
| 2009/0226810 | A1 | 9/2009 | Paulsen et al. |
| 2009/0278082 | A1 | 11/2009 | Takebayashi et al. |
| 2010/0062341 | A1* | 3/2010 | Hambitzer ............... 429/231.95 |
| 2010/0068627 | A1 | 3/2010 | Muraoka et al. |

FOREIGN PATENT DOCUMENTS

| | | | |
|---|---|---|---|
| EP | 1873847 | | 1/2008 |
| JP | 3031546 | | 4/2000 |
| JP | 2001313034 | A * | 11/2001 |
| JP | 2002-042817 | | 2/2002 |
| JP | 2002-198033 | | 7/2002 |
| JP | 2003142093 | | 5/2003 |
| JP | 2003-208894 | | 7/2003 |
| JP | 2007-048525 | | 2/2007 |
| JP | 2007-265668 | | 10/2007 |
| JP | 2007-280917 | | 10/2007 |
| JP | 2007265668 | | 10/2007 |
| JP | 2007-294461 | | 11/2007 |
| JP | 2009-64770 | | 3/2009 |
| KR | 20090105883 | A | 10/2009 |
| WO | WO 2008-058685 | * | 5/2009 |
| WO | WO 2009/097680 | | 8/2009 |
| WO | WO 2010/029676 | | 3/2010 |
| WO | WO 2010/090029 | | 12/2010 |

OTHER PUBLICATIONS

Croguennec et al., "Synthesis of "$Li_{1.1}(Ni_{0.425}Mn_{0.425}Co_{0.15})_{0.9}O_{1.8}F_{0.2}$" Materials by Different Routes: Is There Fluorine Substitution for Oxygen?" Journal of The Electrochemical Society, vol. 156, No. 5, (2009), pp. A349-A355.

International Preliminary Report on Patentability, issued in co-assigned PCT/EP2010/006352, dated Nov. 29, 2011.

International Preliminary Report on Patentability, issued in PCT/EP2010/006351, dated May 18, 2012.

International Search Report, issued in co-assigned PCT/EP2010/006352, dated Feb. 7, 2011.

International Search Report, issued in PCT/EP2010/006351, dated Nov. 24, 2010.

Menetrier et al., "NMR Evidence of LiF Coating Rather than Fluorine Substitution in $Li(Ni_{0.425}Mn_{0.425}Co_{0.15})O_2$," Journal of Solid State Chemistry, vol. 181, No. 12, (Dec. 1, 2008), pp. 3303-3307.

* cited by examiner

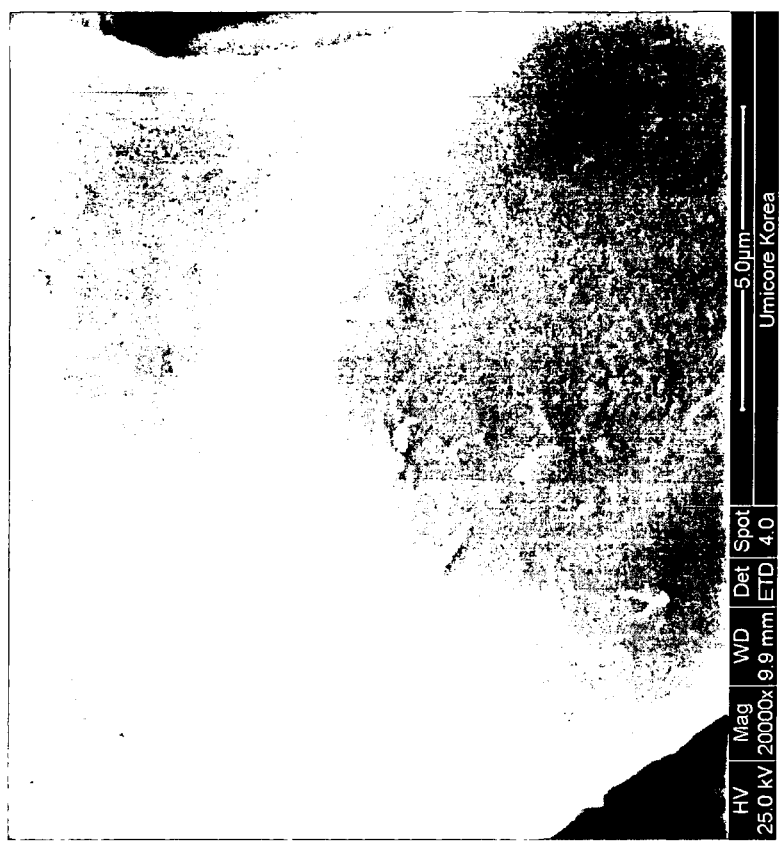
Figure 7A

DOUBLE-SHELL CORE LITHIUM NICKEL MANGANESE COBALT OXIDES

This application is a National Stage application of International Application No. PCT/EP2010/006351, filed Oct. 19, 2010, which claims the benefit of U.S. Provisional Application No. 61/258,635, filed Nov. 6, 2009, the entire contents of which are hereby incorporated herein by reference. This application also claims priority under 35 U.S.C. §119 to European Patent Application No. 09013886.8, filed Nov. 5, 2009, and European Patent Application No. 10005780.1, filed Jun. 3, 2010, the entire contents of which are hereby incorporated herein by reference.

TECHNICAL FIELD AND BACKGROUND

The invention relates to cathode material for rechargeable lithium batteries, particularly lithium nickel manganese cobalt oxides being coated with a fluorine containing polymer and heat treated afterwards.

Previously $LiCoO_2$ was the most used cathode material for rechargeable lithium batteries. However, recently a substitution of $LiCoO_2$ by lithium nickel oxide based cathodes and by lithium nickel manganese cobalt oxides is in full progress. In these substitute materials, depending on the choice of metal composition, different limitations occur or challenges need to be solved. For simplicity reasons, the term "Lithium nickel oxide based cathodes" will be further referred to as "LNO", and "lithium nickel manganese cobalt oxides" will be further referred to as "LMNCO".

One example of an LNO material is $LiNi_{0.80}Co_{0.15}Al_{0.05}O_2$. It has a high capacity, however it is difficult to prepare, since typically a carbon dioxide free atmosphere (oxygen) is needed and special carbonate free precursors like lithium hydroxide are used instead of lithium carbonate. Hence such manufacturing restraints tend to increase the cost of this material considerably. LNO is a very sensitive cathode material. It is not fully stable in air, which makes large scale battery production more difficult, and—caused by its lower thermodynamic stability—in real batteries it is responsible for a poor safety record. Finally, it is very difficult to produce lithium nickel oxide with a low content of soluble base.

By "soluble base" is meant lithium located near to the surface that is less stable thermodynamically and goes into solution, whilst lithium in the bulk is thermodynamically stable and cannot be dissolved. Thus a gradient of Li stability exists, between lower stability at the surface and higher stability in the bulk. The presence of "soluble base" is a disadvantage because a high base content is often connected with problems during battery manufacturing: during slurry making and coating high base causes a degradation of the slurry (slurry instability, gelation) and high base is also a responsible for poor high temperature properties, like excessive gas generation (swelling of the batteries) during high temperature exposure. By determining the "soluble base" content by pH titration, based on the ion exchange reaction $(LiMO_2+\delta H^+ \leftarrow\rightarrow Li_{1-\delta}H_\delta MO_2+\delta Li^+)$, the Li gradient can be established. The extent of this reaction is a surface property.

In US2009/0226810A1 the problem of soluble base is further discussed: $LiMO_2$ cathode material is prepared using mixed transition metal hydroxides as precursors. These are obtained by co-precipitating transition metal sulphates and technical grade bases like NaOH, which is the cheapest industrial route for $LiMO_2$ precursor preparation. This base contains $CO_3^{2-}$ anion in the form of $Na_2CO_3$, which is trapped in the mixed hydroxide—the mixed hydroxide typically containing between 0.1 and 1 wt % of $CO_3^{2-}$. Besides the transition metal precursor, the lithium precursor $Li_2CO_3$, or a technical grade $LiOH*H_2O$, containing at least 1 wt % of $Li_2CO_3$ is used. When the lithium and transition metal precursors are reacted at high temperature, typically above 700° C. In the case of high nickel cathode LNO, the $Li_2CO_3$ impurity remains in the resulting lithium transition metal oxide powder, especially on its surface. When higher purity materials are used, less $Li_2CO_3$ impurity is found, but there is always some LiOH impurity that reacts with $CO_2$ in the air to form $Li_2CO_3$. Such a solution is proposed in JP2003-142093, however the use of expensive precursors of very high purity is not preferred.

An example of LMNCO is the well known $Li_{1+x}M_{1-x}O_2$ with $M=Mn_{1/3}Ni_{1/3}CO_{1/3}O_2$, where the manganese and nickel content is about the same. "LMNCO" cathodes are very robust, easy to prepare, have a relatively low content of cobalt and thus generally tend to cost less. Their main drawback is a relatively low reversible capacity. Typically, between 4.3 and 3.0V the capacity is less than or about 160 mAh/g, compared with 185-195 mAh/g for LNO cathodes. A further drawback of LMNCO compared with LNO is the relatively low crystallographic density, so the volumetric capacity is also less; and a relatively low electronic conductivity.

In between LNO and LMNCO type materials we can situate "Nickel rich lithium nickel manganese cobalt oxides" $Li_{1+x}M_{1-x}O_2$ where $M=Ni_{1-x-y}Mn_xCo_y$, or $M=Ni_{1-x-y-z}Mn_xCo_yAl_z$, with Ni:Mn larger than 1, having typically values for Ni:Mn of 1.5 to 3, and a Co content "y" typically between 0.1 and 0.3. For simplicity we refer to this class of materials as "LNMO". Examples are $M=Ni_{0.5}Mn_{0.3}Co_{0.2}$, $M=Ni_{0.67}Mn_{0.22}Co_{0.11}$, and $M=Ni_{0.6}Mn_{0.2}Co_{0.2}$.

Compared with LNO, LNMO can be prepared by standard processes (using a $Li_2CO_3$ precursor) and no special gas (such as oxygen as mentioned above) is needed. Compared to LMNCO, LNMO has a much higher intrinsic capacity and possibly a lower tendency to react with electrolyte (which is normally characterized by dissolution of Mn) at elevated temperature. Thus it becomes apparent that LNMO will possibly play a major role in the substitution of $LiCoO_2$. Generally, the base content increases, and the safety performance tends to deteriorate with increasing Ni:Mn ratio. On the other hand it is widely accepted that high Mn content helps to improve safety.

A high base content is related to moisture sensitivity. In this regard LNMO is less moisture sensitive than LNO but more sensitive than LMNCO. Directly after preparation, a well prepared LNMO sample has a relatively low content of surface base, and if it is well prepared most of the surface base is not $Li_2CO_3$ type base. However, in the presence of moisture, airborn $CO_2$ or organic radicals reacts with LiOH type base to form $Li_2CO_3$ type base. Similar, the consumed LiOH is slowly re-created by Li from the bulk, thus increasing the total base (total base=mol of $Li_2CO_3$+LiOH type base). At the same time, the moisture (ppm $H_2O$) increases. These processes are very bad for battery making. $Li_2CO_3$ and moisture are known to cause severe swelling, and to deteriorate the slurry stability. Hence it is desired to decrease the moisture sensitivity of LNMO and LNO materials.

In US2009/0194747A1 a method to improve the environmental stability of LNO cathode materials is described. The patent discloses a polymer coating of nickel based cathode materials, in the form of a single layer of non-decomposed polymer. The polymers (e.g. PVDF) are chosen from binders typically used in the manufacturing (slurry making for electrode coating) of lithium ion batteries.

Thermal stability (safety) is related to interfacial stability between electrolyte and cathode material. A typical approach to improve the surface stability is by coating. Many different examples of coatings are available in literature and especially in patent literature. There are different ways to categorize coatings. For example, we can distinguish between ex-situ and in-situ coating. In ex-situ coating a layer is coated onto the particles. The coating can be obtained by dry or wet coating. Generally the coating is applied in a separate process involving at least the coating step and generally an additional heating step. Thus the total cost of the process is high. Alternatively, in some cases an in-situ coating—or self organized coating—is possible. In this case the coating material is added to the blend before cooking, and during cooking separate phases form, preferable the coating phase becomes liquid, and if the wetting between $LiMO_2$ and the coating phase is strong then a thin and dense coating phase ultimately covers the electrochemical active $LiMO_2$ phase. Evidently, in-situ coating is only efficient if the coating phase wets the core.

We can also distinguish between cationic and anionic coating. An examples for cationic coating is $Al_2O_3$ coating. Examples for anionic coating are fluoride, phosphate, silicate coating and the like. Fluoride coating is especially preferred because a protecting film of LiF is formed. Thermodynamically LiF is very stable, and does not react with electrolyte, thus LiF coating is very promising to achieve a good stability at high temperature and voltage. A typical method, such as used by Croguennec et al. in *Journal of The Electrochemical Society*, 156 (5) A349-A355 (2009), is the addition of LiF to the lithium transition metal oxide to achieve the protecting LiF film. However, due to the high melting point of LiF and also due to poor wetting properties, it is not possible to obtain a thin and dense LiF film. Croguennec reports that, instead of a coating, small particles or 'sheets' can be found in the grain boundaries of the $LiMO_2$ particles. Further possible methods are the use of $MgF_2$, $AlF_3$ or lithium cryolite.

We can further distinguish between inorganic and organic coating. An example of organic coating is a polymer coating. One advantage of polymer coating is the possibility of obtaining an elastic coating. On the other hand, problems arise from poor electronic conductivity, and sometimes the poor transport of lithium across the polymer. Generally, polymer coating more or less adheres to the surface, but it does not chemically change the surface.

There cannot be found any experimental data in the prior art that would show that the above described approaches are effective to improve the cited problems of LNO and LNMO materials.

To summarize:
1) LMNCO is a robust material but has severe capacity limitations,
2) It is desired to increase the thermal stability and to reduce the base content of LNO,
3) It is desired to increase the thermal stability and reduce the base content of LNMO.

It is an aim of the present invention to improve or even overcome the problems cited before, and to provide for high capacity alternatives for LMNCO materials.

SUMMARY

Viewed from a first aspect, the invention can provide a lithium transition metal oxide powder for use in a rechargeable battery, having the surface of the primary particles of said powder coated with a first inner and a second outer layer, the second outer layer comprising a fluorine-containing polymer, and the first inner layer consisting of a reaction product of the fluorine-containing polymer and the primary particle surface. In one embodiment this reaction product is LiF, and the lithium originates from the primary particles surface. In another embodiment, the fluorine in the reaction product LiF originates from partially decomposed fluorine-containing polymer present in the outer layer.

In a particular embodiment the first inner layer consists of a LiF film with a thickness of at least 0.5 nm. or at least 0.8 nm, or even at least 1 nm. In another particular embodiment, the fluorine-containing polymer is either one of PVDF, PVDF-HFP or PTFE. The fluorine-containing polymer can be composed of agglomerated primary particles having an average particle size of between 0.2 and 0.5 μm. It is believed that such a particle size is advantageous for the wetting properties of the molten fluorine-containing polymer.

An example of the lithium transition metal oxide can be either one of:
  $LiCO_dM_eO_2$, wherein M is either one or both of Mg and Ti, with e<0.02 and d+e=1;
  $Li_{1+a}M'_{1-a}O_{2\pm b}M^1_k S_m$ with −0.03<a<0.06, b<0.02, M' being a transition metal compound, consisting of at least 95% of either one or more elements of the group Ni, Mn, Co, Mg and Ti; $M^1$ consisting of either one or more elements of the group Ca, Sr, Y, La, Ce and Zr, with 0≤k≤0.1 in wt %; and 0≤m≤0.6, m being expressed in mol %; and
  $Li_aNi_xCo_yM''_zO_{2\pm e}A_f$, with 0.9<a'<1.1, 0.5≤x≤0.9, 0<y≤0.4, 0<z≤0.35, e<0.02, 0≤f≤0.05 and 0.9<(x+y+z+f)<1.1; M" consisting of either one or more elements from the group Al, Mg, and Ti; A consisting of either one or both of S and C.

In an example embodiment, M'=$Ni_{a''}Mn_{b''}Co_{c''}$, with a">0, b">0, c">0 and a"+b"+c"=1; and a"/b">1. In another embodiment 0.5≤a"≤0.7, 0.1<c"<0.35, and a"+b"+c"=1. The embodiments where a"/b">1 are particularly suitable for use in lithium-ion prismatic or polymer batteries.

The pristine polymer applied for the initial coating contains fluorine. In one embodiment it contains at least 50% by weight of fluorine. A typical example of a pristine polymer is a PVDF homopolymer or PVDF copolymer (such as HYLAR® or SOLEF® PVDF, both from Solvay SA, Belgium). Another known PVDF based copolymer is for example a PVDF-HFP (hexa-fluoro propylene). Such polymers are often known under the name "Kynar®". Teflon, or PTFE, could also be used as polymer.

Viewed from a second aspect, the invention can provide a process for covering a lithium transition metal oxide powder with a fluorine containing double-layered coating, comprising the steps of:
  providing a bare lithium transition metal oxide powder, mixing this powder with a fluorine-containing polymer, and
  heating the obtained powder-polymer mixture at a temperature between at least 50° C. and at most 140° C. above the melting temperature of the fluorine-containing polymer, whereby, on the surface of the metal oxide powder a double-layered coating is formed, consisting of an outer layer consisting of fluorine-containing polymer, and an inner layer consisting of a reaction product of the powder surface and the polymer.

In one embodiment, the amount of fluorine-containing polymer in the powder-polymer mixture is between 0.1 and 2 wt %, in another embodiment between 0.2 and 1 wt %. Also, the inner layer preferably consists of LiF. An example inner layer has a thickness of at least 0.5 nm, or at least 0.8 nm, and even at least 1 nm.

One example process uses a fluorine-containing polymer such a PVDF, and the powder-polymer mixture is heated at a temperature between 220 and 325° C. for at least one hour. In a particular embodiment, heating is between 240 and 275° C. for at least one hour.

An example of the lithium transition metal oxide used in the process is either one of:
- $LiCO_dM_eO_2$, wherein M is either one or both of Mg and Ti, with $e<0.02$ and $d+e=1$;
- $Li_{1+a}M'_{1-a}O_{2\pm b}M^1{}_k S_m$ with $-0.03<a<0.06$, $b<0.02$, M' being a transition metal compound, consisting of at least 95% of either one or more elements of the group Ni, Mn, Co, Mg and Ti; $M^1$ consisting of either one or more elements of the group Ca, Sr, Y, La, Ce and Zr, with $0 \le k \le 0.1$ in wt %; and $0 \le m \le 0.6$, m being expressed in mol %; and
- $Li_aNi_xCo_yM''_zO_{2\pm e}A_f$, with $0.9<a'<1.1$, $0.5 \le x \le 0.9$, $0<y \le 0.4$, $0<z \le 0.35$, $e<0.02$, $0 \le f \le 0.05$ and $0.9<(x+y+z+f)<1.1$; M" consisting of either one or more elements from the group Al, Mg, and Ti; A consisting of either one or both of S and C.

In an example embodiment, $M'=Ni_{a''}Mn_b$—$Co_{c'''}$, with $a''>0$, $b''>0$, $c''>0$ and $a''+b''+c''=1$; and $a''/b''>1$. In another embodiment $0.5 \le a'' \le 0.7$, $0.1<c''<0.35$, and $a''+b''+c''=1$.

DETAILED DESCRIPTION

Figure 1:
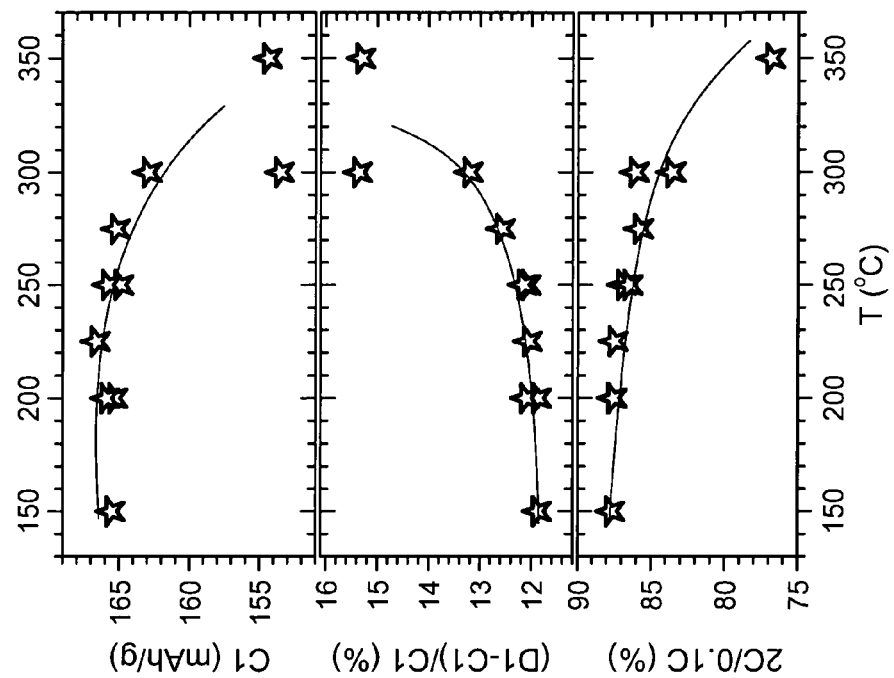
FIG. 1: Unit cell volume (bottom), base content (middle, in μmol/g) and moisture content (ppm) of a LNMO/1% PVDF mixture against heating temperature.

In simple terms, the structure of the cathode material in the first aspect of the invention can for example be described as a double-shell—core design. The double-shell is not obtained by repeated coating but by an in-situ reaction between an initial coating and the surface of the material core. The reaction occurs at a certain heating temperature as is disclosed below. The outermost part of the double-shell is a thin layer of polymer. The polymer is partially decomposed and in contact with a very thin inner layer—basically being lithium fluoride—which again covers the LNO or LNMO core. The LiF layer originates from the reaction of the decomposing polymer with lithium containing surface base of the LNO or LNMO. Whereas a normal fluoride containing polymer, such as Kynar® (see also below), just melts upon heating, it has been established that the contact with the Li base on the surface of the transition metal oxide initiates a chemical reaction leading to the decomposition of the polymer. This decomposition could eventually end up in generating gasses that evaporate, and remaining carbon, which, at sufficient temperature decomposes as well, surprisingly without reacting with the particles to re-create a $Li_2CO_3$ type base. It can be speculated that the LiF film protects the Li in the particle by preventing the reaction of carbon that forms $Li_2CO_3$. It is clear that this 'full' decomposition—in contrast with the partly decomposition in the invention—will only occur if enough heat is applied. Depending on the quantity of polymer coated on the transition metal oxide, the outer shell comprises more or less pristine (unreacted) polymer, besides a partly decomposed polymer. In that sense the term 'partly decomposed' covers both of:
- a mixture of decomposed and pristine polymer, and
- a mixture of polymer that is more or less decomposed, but that can still be considered to be a polymer, albeit having a different composition than the original pristine polymer.

In practice, the term 'double-shell' can cover, besides the inner LiF shell, an outer shell, consisting of partly decomposed polymer, and possibly also covered by a layer of less decomposed or even pristine polymer. The double-shell has the following function: the outer layer of partly decomposed polymer protects against moisture uptake, whereas the thin LiF based inner layer replaces the reactive surface base layer, thus reducing base content and improving safety.

The examples of the surface coated lithium transition metal oxides do not correspond to the above described background coating categories: in the examples we observe the presence of a reaction product, originating from decomposed polymer, and the formation of a double-shell. Hence it is not a polymer coating as disclosed in US2009/0194747A1. Nor is it the same as anion coating, because (a) a partially decomposed polymer plays a key role and (b) the coating by LiF occurs at a low temperature, since at higher temperatures LiF crystallizes. Finally it is neither in-situ nor ex-situ coating but in fact something in between.

An example process of the covering of the lithium transition metal oxides comprises the following steps:
1) Mixing of the LNO or LNMO cathode with a small amount of pristine polymer.
2) Heating the mixture to a temperature above the melting point of the polymer and continuing to heat until the polymer reacts with the cathode powder.
3) Cooling down when the polymer has fully decomposed.

The mixing step in the example process can also consist of either (1) wet coating or (2) dry coating. In a wet coating process the polymer is dissolved in a solvent, then the powder is immersed in the solution and the slurry (or moist powder) is dried. In a dry coating process the polymer powder is mixed with the powder, heated to a temperature above the melting point of the polymer, and then the molten polymer wets the surface. In one embodiment of the dry coating, a polymer having a small primary particle size, for example much below 1μ is used, in order to obtain a good surface coverage.

In the example process above the LNO/LNMO cathode material is encapsulated in a very thin film. If the film is thick, then it is difficult for the lithium to penetrate the film, thus causing a loss of electrochemical performance (causing low capacity and poor rate performance). If the LNO/LNMO cathode has a high porosity, than an encapsulation without filling of the porosity is difficult, so much more polymer is needed to cover the surface with LiF.

In an example embodiment, the amount of polymer is between 0.1% to 2% by weight. If the polymer loading is less than 0.1% it is difficult to achieve a good film. If it exceeds 2% the capacity of the powder could be lowered. A polymer loading of 0.2-0.5% by weight is used in another example embodiment.

In a particular embodiment the example polymer coating can be a temporary coating with a polymer. It is advisable then that the polymer is highly soluble in the solvent used by battery makers for slurry making. In the production of the final positive electrode, during the slurry making step, the polymer dissolves but the LiF interface remains. Thus the polymer type outer shell protects the LNMO or LNO cathode powder from the time of its preparation, until the time of slurry making, hence being a temporary coating. The protection mechanism is determined by the strong hydrophobic properties of the polymer coating which prevent the adhesion of moisture to the cathode powder surface, thereby preventing (1) significant moisture uptake by the powder, (2) significant transformation rate of LiOH type base towards $Li_2CO_3$ type of base, and (3) it prevents the moisture driven increase of total base content.

Coin cell making involves a step which is the slurry making. A typical solvent used by battery makers for slurry preparation is N-Methylpyrrolidone (NMP). Therefore an example polymer used for the coating could be soluble in NMP. Also, it is an advantage if the polymer is compatible with the Li battery chemistry. Thus, another example polymer is basically the same as the binder used by the battery maker. Battery makers use PVDF based polymers as binder. Thus—the coating polymer is in that example a PVDF based polymer. During the slurry making the polymer coating dissolves, but the LiF film, protecting the surface, remains.

As said above, a particular embodiment of the coating step is dry coating followed by a heating step to a temperature significantly higher than the melting temperature of the polymer. Only if the melting temperature is far exceeded the molten polymer reacts with the surface base and efficiently wets the surface of the LNO/LNMO particles. In another particular embodiment a powder mixture of LNMO or LNO and a PVDF based polymer powder is heat treated at a temperature exceeding 220° C., which is at least 50° C. above the melting temperature of the PVDF (different PVDF's have melting temperatures ranging from 135 to 170° C.). In yet another embodiment a PVDF based polymer powder is heat treated at a temperature between 225 and 320° C. It has been established that wetting in this temperature range not only has a physical effect (due to the low viscosity of the polymer) but that reactions between the surface base of the LNO/LNMO and the polymer play a role as well. If the temperature is lower than 220° C. then the polymer might melt but wetting is not excellent. As a result a poor surface coverage is achieved. If the temperature exceeds 320° C. then the polymer fully decomposes. Note that the temperature at which the chemical reaction with the Li base occurs is lower than the temperature at which Kynar or PVDF starts decomposing by simply heating in air, which is around 350-375° C. As PTFE has a melting temperature around 330° C., it is clear that the heating temperature for obtaining a LiF layer will be at least 380° C. in case PTFE is used as polymer.

It is appropriate to mention that in US2009/0194747A1 (assigned to INCO) the PVDF binder material is applied at a temperature below its decomposition temperature so no LiF film forms and all applied polymer is still present and chemically unchanged.

The INCO patent does the polymer coating step in a liquid phase—either at high temperature or (preferred) in dissolved form. The INCO patent observes poor adhesion between polymer and cathode powder—and thus adds lewis acid like oxalic acid to improve the adhesion, and specifically also to neutralize any LiOH on the cathode material surface, to avoid its reaction with the PVDF.

The embodiments of the covering method explained before follow a different concept. First, the mixture of polymer and cathode is typically done at room temperature and in solid form. Then the mixture is heated to a temperature where the decomposition of the polymer starts through the reaction with the cathode powder surface. On the one hand, the time of the heat treatment is limited, so that the polymer does not decompose completely, on the other hand it is long enough so that the polymer at the polymer-cathode interface sufficiently reacts to form a LiF based interfacial film. Secondly, no Lewis acid needs to be added. We discovered that—surprisingly—the poor adhesion between cathode and polymer is caused by the low heating temperature. If the temperature is increased, so that the polymer and the cathode surface start a chemical reaction, a very strong adhesion is obtained. In fact, we observe an excellent wetting of the molten polymer onto the surface of the cathode power particles. We believe that the excellent wetting is an evidence for the decomposition of polymer on the cathode surface.

Naturally LNMO cathode materials are of interest for cylindrical cells. This is because of their high capacity, and because the drawback of LNMCO, which is gas evolution—which is believed to be related to the base content—is manageable in cylindrical cells (cylindrical cells have a very rigid case). Currently, implementation to prismatic cells is more difficult, and practically impossible for polymer cells because the swelling is not easy to manage. LNMO cathode materials according to the present invention have a lower base content because a LiF film replaces the surface base. Also, they have an improved safety, which would allow to implement such cathodes into prismatic or even polymer cells.

The invention may be practiced, for example, by way of the different examples described below.

Example 1

This example demonstrates the effects of a coating with a fluorine containing polymer followed by a temperature treatment:
1) A reaction between cathode and polymer happening at higher temperature, and
2) Formation of a LiF protective film Also, the example investigates the influence of the temperature on samples coated by polymer having a LiF interface. This example shows results for samples prepared by adding 1% polymer. A LNMO mass production sample is used as cathode precursor (precursor=uncoated or bare sample). The composition is $Li_{1+x}M_{1-x}O_2$ with $M=Ni_{0.5}Mn_{0.3}Co_{0.2}$ and x about 0.00. The precursor further contains 0.145 mol % S and 142 ppm Ca.

100 g of cathode precursor and 10 g of PVDF powder are carefully premixed using a coffee grinder. Then the 110 g of intermediate mixture is mixed with 900 g remaining cathode precursor, at medium energy using a Haensel type mixer. The precursor-PVDF mixture is sampled to batches of 100 g each. These batches are heat treated for 5 h at temperatures ranging from 150 to 350° C. Since the mass of the sample changes during heat treatment—because the polymer partially or fully decomposes—1% PVDF refers to an addition of 1 g PVDF per 100 g of sample used as precursor. The exact amount per g of final sample might be slightly lower, for example if no mass is lost during heat treatment the correct value would be 0.99%. The resulting powders are sieved. Two series of experiments are conducted. An initial series at 150, 200, 250, 300 and 350° C.; and a repeat at T=25, 150, 180, 200, 225, 250, 275, 300, 325, 350° C. For the two series an additional 'blank' sample without PVDF is added.

The powders of selected samples are analyzed as follows:
1) X-ray and Rietveld refinement to obtain the accurate lattice parameters,
2) Coin cell testing to measure electrochemical performance (only first series),
3) Scanning Electron Microscopy (SEM) and/or Field Emmission gun Scanning Electron Microscopy (FE-SEM), and
4) A humidity exposure test (5 days, 50% humidity, 30° C.), with:
  A. measurement of moisture content before and after exposure
  B. adapted pH titration of soluble base before and after exposure An overview of the test results is given in Table 1 and FIGS. 1-5.

In this and all of the following examples, electrochemical performance is tested in coin type cells, with a Li foil as counter electrode in a litium hexafluorite ($LiPF_6$) type electrolyte at 25° C. Cells are charged to 4.3 V and discharged to 3.0 V to measure rate performance and capacity. The capacity retention during extended cycling is measured at 4.5V charge voltage. Specific capacity of 160 mAh/g is assumed for the determination of the discharge rates. For example, for discharge at 2 C, a specific current of 320 mA/g is used. This is an overview of the test:

| Cycle | Charge | Discharge | |
|---|---|---|---|
| 1 | 4.3 V, 0.1 C | 3.0 V, 0.1 C | Voltage profile |
| 2-6 | 4.3 V, 0.25 C | 3.0 V, 0.2, 0.5, 1, 2, 3 C | Rate performance |
| 7, 31 | 4.5 V, 0.25 C | 3.0 V, 0.1 C | Slow reference cycle before and after stability |
| 8, 32 | 4.5 C, 0.25 C | 3.0 V, 1 C | Fast reference cycle before and after stability |
| 9-30 | 4.5 V, 0.25 C | 3.0 V, 0.5 C | Stability test |

The following definitions are used for data analysis: (Q: capacity, D; Discharge, C; Charge)

Irreversible capacity Q(irr) is (QC1−QD1)/C1

Fade rate (0.1 C) per 100 cycles: (1−QD31/QD7)*100/23

Fade rate (1.0 C) per 100 cycles: (1−QD32/QD8)*100/23

Energy fade: instead of discharge capacity QD the discharge energy (capacity×average discharge voltage) is used.

Regarding the pH titration: PVDF coated samples are often strongly hydrophobic, which makes a pH titration in aqueous solution difficult. Therefore samples of 7.5 g are first wetted in 10 g acetone, then 90 g water is added, followed by stirring for 10 minutes. After filtering the content of soluble base in the clear filtrate is titrated by standard pH titration using 0.1M HCl.

TABLE 1

List of samples, preparation and results

| | Preparation | | | As prepared | | | | | $H_2O$ exposed | |
|---|---|---|---|---|---|---|---|---|---|---|
| Sample | Series | PVDF wt % | T ° C. | Q (0.1 C) mAh/g | Q(irr) % | Rate (2 C) % | Vol Å³ | Base µmol/g | Base µmol/g | $H_2O$ ppm |
| EX0102 | — | 0 | 25 | 167.07 | 11.65 | 87.81 | 33.8671 | 68.1 | 89.9 | 603 |
| EX0121 | 1aε ± b | 1 | 150 | 165.54 | 11.87 | 87.68 | 33.8624 | | 62.5 | 439 |
| EX0124 | 1aε ± b | 1 | 200 | 165.34 | 11.87 | 87.58 | 33.8740 | | 53.6 | 319 |
| EX0127 | 1aε ± b | 1 | 250 | 164.94 | 12.08 | 86.92 | 33.8763 | 36.3 | 38.4 | 236 |
| EX0159 | 1aε ± b | 1 | 300 | 153.50 | 15.36 | 83.59 | 33.8867 | 18.5 | 17.5 | 233 |
| EX0161 | 1aε ± b | 1 | 350 | 154.35 | 15.30 | 76.80 | 33.8839 | 19.8 | 16.8 | 474 |
| EX0316 | — | 1 | 25 | | | | 33.8687 | 61.2 | | |
| EX0317 | 2a | 1 | 150 | | | | 33.8716 | 55.5 | | |
| EX0318 | 2a | 1 | 180 | | | | 33.8659 | 53.7 | | |
| EX0319 | 2a | 1 | 200 | 165.91 | 12.11 | 87.52 | 33.8692 | 54.3 | | |
| EX0320 | 2a | 1 | 225 | 166.60 | 12.05 | 87.47 | 33.8714 | 46.9 | | |
| EX0321 | 2a | 1 | 250 | 165.81 | 12.16 | 86.48 | 33.8716 | 41.4 | | |
| EX0322 | 2a | 1 | 275 | 165.18 | 12.58 | 85.77 | 33.8751 | 28.8 | | |

TABLE 1-continued

List of samples, preparation and results

| | | Preparation | | As prepared | | | | H$_2$O exposed | |
|---|---|---|---|---|---|---|---|---|---|
| Sample | Series | PVDF wt % | T ° C. | Q (0.1 C) mAh/g | Q(irr) % | Rate (2 C) % | Vol Å$^3$ | Base µmol/g | Base µmol/g | H$_2$O ppm |
| EX0323 | 2a | 1 | 300 | 162.94 | 13.21 | 86.06 | 33.8782 | 31.6 | | |
| EX0324 | 2a | 1 | 325 | | | | 33.8896 | 38.7 | | |
| EX0325 | 2a | 1 | 350 | | | | 33.8917 | 39.5 | | |

The indication of the Series refers to FIGS. 1-2

FIG. 1 shows:
1) Bottom: the results for the unit cell volume for one formula unit (LiMO$_2$) obtained by Rietveld refinement of the powder diffraction data (Series 1b: ∇, 2a: Δ),
2) Middle: the content of soluble base obtained by pH titration before (Series 1a: ★, 2a: ΔA) and after humidity exposure (Series 1b: ○),
3) Top: the moisture content after humidity exposure (Series 1b: ∇)

FIG. 2 shows the electrochemical performance of the samples without humidity exposure.

The following can be observed on FIG. 1:

Unit cell volume: a continued increase of unit cell volume at T≥175° C., and a stepwise increase at T≅300–325° C. The increase of lattice constants is almost certainly caused by a partial delithiation. The delithiation is driven by the decomposition of fluorine containing polymer, where lithium reacts with the polymer to form LiF. The unit cell volume indicates that up to 180° C. no reaction between PVDF and cathode occurs, since the volume of not heat treated precursor is also 33.8671 Å$^3$. Only at about 200° C. the reaction starts and at about 300° C. a major reaction occurs. We conclude that a film of LiF will be present at temperatures above 200° C.

Base: less soluble base at higher treatment temperature. An optimum (lowest base) is observed at approx. 275-325° C. Soluble base is located on the surface, and dissolves into water to form LiOH or Li$_2$CO$_3$. Soluble base is the most reactive form of lithium. Thus, the lithium in the LiF which is formed by the reaction of fluorine containing polymer with the surface, will originate from the soluble base. In effect a LiF film replaces a film of soluble base. We observe that at least 250° C. is needed to reduce the soluble base by 50%. At higher temperature (>325° C.) new soluble base can re-form from the bulk, replacing the base which has been consumed by the LiF film formation.

Moisture: a very low moisture content, together with a good moisture stability at >200 to about 325° C. At temperatures above 325° C. the polymer is gradually fully decomposing, and the surface is no longer protected against moisture uptake. At temperatures below 200° C. the polymer does not fully cover the surface. Only at a sufficient high, but not too high temperature the surface is covered by a partly decomposed polymer film which protects against moisture uptake. It is obvious that a good coverage (=good wetting properties) are related to the reaction of polymer and soluble base on the surface.

Figure 2A:
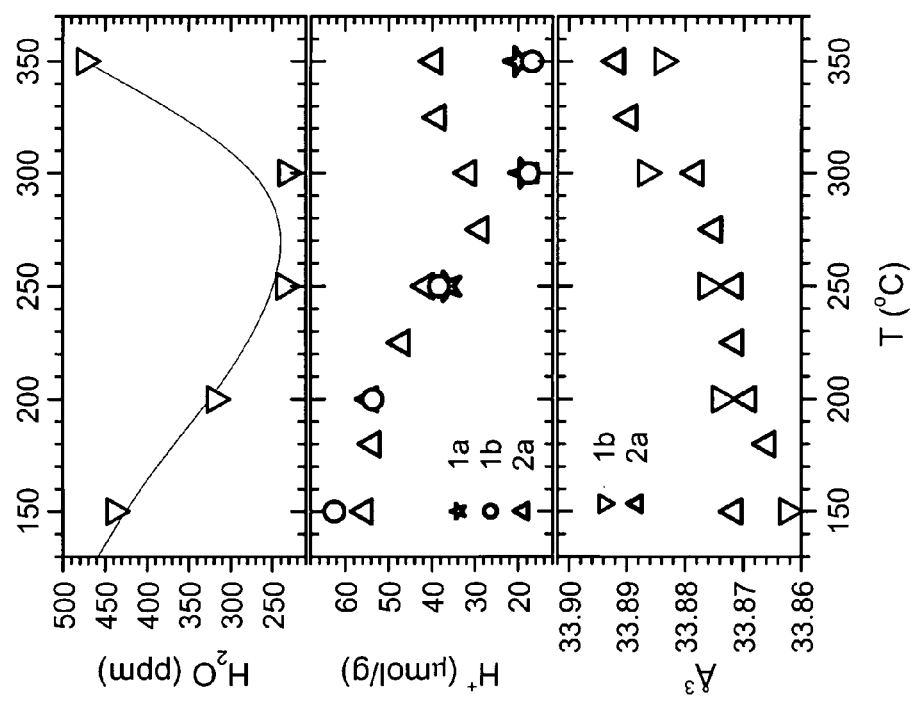
FIG. 2a: Rate (bottom, 1 C vs. 0.1 C in %); irreversible capacity (middel, in mAh/g) and reversible capacity (top, in mAh/g) of a LNMO/1% PVDF mixture against heating temperature.

FIG. 2a shows (TOP:) that the reversible capacity (C1: cycle 1) of the coated powder decreases whilst (MIDDLE:) the irreversible capacity (Qirr=[Discharge-Charge]/Charge, in %) increases significantly at temperatures above 300° C. At the same time (BOTTOM:) the rate performance (2 C versus 0.1 C, in %) deteriorates. There are 2 reasons for this observation:

1) Li is lost from the cathode to form LiF. If the oxygen stoichiometry equilibrates, then the loss of Li results in Li deficient-Li$_{1-x}$M$_{1+x}$O$_2$. 1 wt % PVDF contains about 6000 ppm fluorine, corresponding to a loss of about 3 mol % lithium. Generally, lithium deficient-Li$_{1-x}$M$_{1+x}$O$_2$ has low rate performance and a high irreversible capacity;
2) The surface is covered by an electronically and ionically insulating LiF film, which is thicker than desired, which causes a poor rate performance.

Figure 2B:
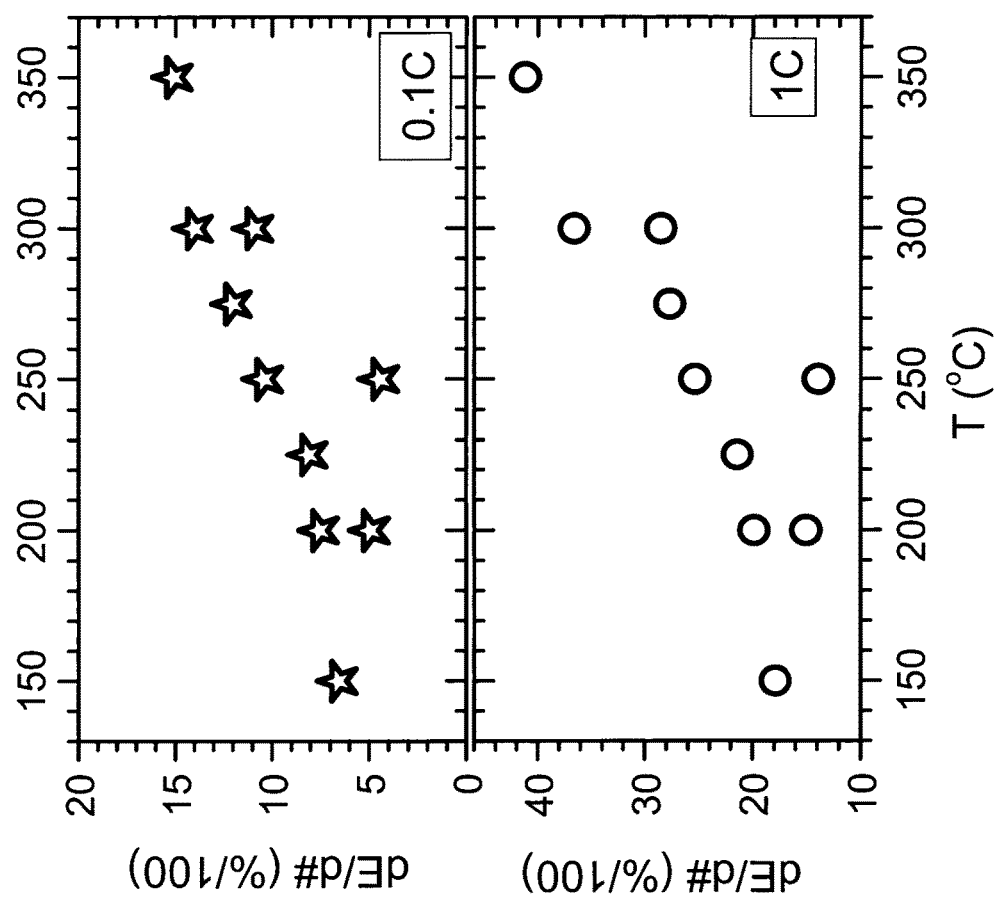
FIG. 2b: Energy fade measured at in % per 100 cycles) measured at 0.1 C rate (top) or 1 C rate (button) of a LNMO/1% PVDF mixture against heating temperature.

FIG. 2b shows the results for the energy fade (capacity× average discharge voltage, measured at either 0.1 C (TOP) or 1 C (BOTTOM)) after cycling for 23 cycles between 3.0 and 4.5. FIG. 2b indicates an increase of cycling stability with increasing temperature until 250° C. The possibly improved cycling stability is almost certainly to be attributed to the formation of a protecting LiF film.

Figure 3:
FIG. 3: SEM of LNMO/1% PVDF mixture heated at 200° C.
Figure 4:
FIG. 4: FESEM micrograph of LNMO/1% PVDF mixture heated at 250° C.
Figure 5:
FIG. 5: SEM of LNMO/1% PVDF mixture heated at 350° C.

FIGS. 3-5 shows the micrograph of the sample prepared at 200° C. (SEM—FIG. 3), 250° C. (FESEM—FIG. 4) and 350° C. (FESEM—FIG. 5). FIG. 3 shows the SEM of a sample prepared at 200° C.: a particle is shown with many small "droplets" on the surface. The droplets are possibly molten PVDF particles. Evidently, the PVDF does not wet the surface. At 250° C. (see FIG. 4) the drops disappear and the surface is smoothly covered by a PVDF film and surface structures indicate the formation of LiF plates below the film. At 350° C. (FIG. 5) the polymer has fully decomposed and the surface is covered by small crystalline plates of lithium fluoride.

Conclusion: Example 1 demonstrates that at a temperature above 200° C. but below 350° C. a polymer film covers the particles, where the interface between the polymer and the cathode surface is a film of LiF. The LiF film has replaced the soluble surface base of the cathode.

Example 2

Example 1 investigated a coating by 1% PVDF. However, at treatment temperatures T>275° C., and especially >300° C., it is observed that the decomposing polymer extracts so much Li from the cathode, causing a decrease of the reversible capacity. This indicates that the resulting LiF film might become unnecessarily thick. Therefore the present example illustrates the invention for a heat treatment using less polymer, only 0.3 wt % PVDF. As before, the example investigates the influence of temperature on the preparation of samples coated by polymer having an LiF interface. An LNMO mass production sample is used as cathode precursor. Its composition is Li$_{1+x}$M$_{1-x}$O$_2$ with M=Ni$_{0.5}$Mn$_{0.3}$Co$_{0.2}$ and x about 0.00. The precursor further contains 0.145 mol % 5 and 142 ppm Ca.

100 g of cathode precursor and 3 g of PVDF powder are carefully premixed using a coffee grinder. Then the 103 g of mixture is mixed with the remaining 900 g cathode precursor, and mixed at medium energy using a Haensel type mixer. The mixture is sampled to batches of 100 g each. These batches are heat treated for 5 h at temperatures ranging from 225-350° C. Samples are prepared at 225, 250, 275, 300, 325 and 350° C. against a 'blank' sample without PVDF. The resulting powders are sieved, and analyzed in a similar manner as in Example 1. Table 2 gives a summary of samples, preparation and results:

| | Preparation | | As prepared | | | | | H₂O exposed | |
|---|---|---|---|---|---|---|---|---|---|
| Sample | PVDF wt % | T ° C. | Q (0.1 C) mAh/g | Q(irr) % | Rate (2 C) % | Vol Å³ | Base μmol/g | Base μmol/g | H₂O ppm |
| EX0102 | 0 | 25 | 167.07 | 11.65 | 87.81 | 33.8671 | 68.1 | 89.9 | 603 |
| EX0120 | 0.3 | 150 | | | | | | | 560 |
| EX0123 | 0.3 | 200 | | | | | | | 408 |
| EX0126 | 0.3 | 250 | | | | | | | 390 |
| EX0158 | 0.3 | 300 | 166.25 | 11.87 | 85.99 | 33.8680 | 23.1 | 30.6 | 443 |
| EX0160 | 0.3 | 350 | 168.93 | 11.21 | 86.66 | | 29.3 | 38.4 | 521 |
| EX0326 | 0.3 | 225 | 167.18 | 11.79 | 87.87 | | 45.4 | 50.9 | 380 |
| EX0327 | 0.3 | 250 | 165.69 | 11.96 | 87.31 | | 39.4 | 40.7 | 302 |
| EX0328 | 0.3 | 275 | 165.84 | 12.11 | 87.49 | | 28.7 | 33.0 | 425 |
| EX0329 | 0.3 | 300 | 166.68 | 11.91 | 86.76 | | 29.0 | 34.2 | 461 |
| EX0330 | 0.3 | 325 | 167.45 | 11.80 | 86.55 | | 28.0 | 33.8 | 450 |
| EX0331 | 0.3 | 350 | 168.63 | 11.60 | 87.19 | | 29.1 | 35.8 | 463 |

Figure 6:
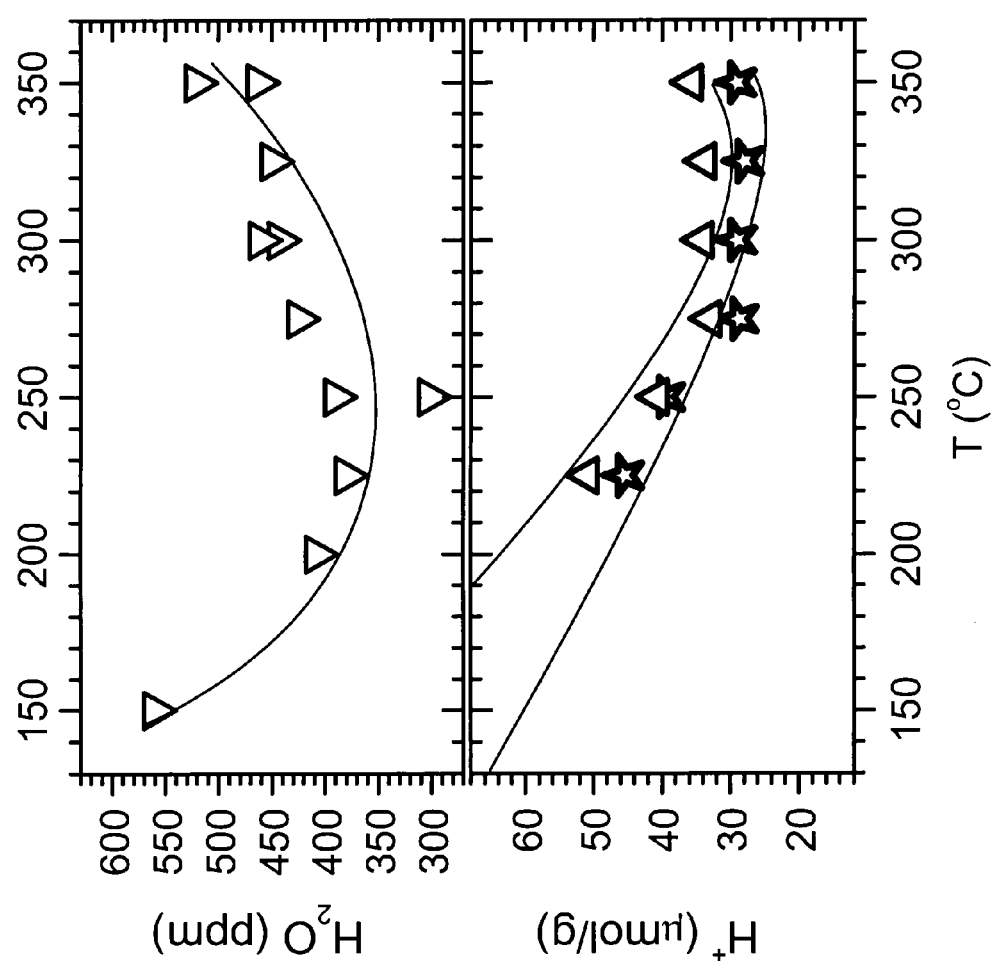
FIG. 6: Top: Mosture content after humidity exposure of a LNMO/0.3% PVDF mixture against heating temperature. Bottom: Base content before (★) and after (Δ) humidity exposure of a LNMO/0.3% PVDF mixture against heating temperature.

FIG. 6 shows (BOTTOM:) results for pH titration before (★) and after (Δ), as well as (TOP:) moisture content after humidity exposure (5 days, 30° C., 50%). It shows that, similar to Example 1, the PVDF treatment lowers the soluble base significantly at temperatures above 250° C. and it protects (but with a lower effect) against moisture uptake, with an optimum at 250-275° C. Good coin cell test results are obtained over the whole temperature region. As the base content decreases a LiF layer forms, and it is assumed that this LiF is beneficial for improving safety performance and high voltage stability in full cells.

It can be concluded that, compared to Example 1, the optimum base content is observed at 275-350° C., the moisture content is lowest in a limited range around 250° C., and the electrochemical test results are excellent in the whole temperature range. Even if some effects can already be observed using 0.1 wt % of PVDF, it seems that 0.3 wt % PVDF is near to the lower limit to achieve the desired results, where 1 wt % PVDF could be the upper limit; combined with a heating temperature of 200 to 300° C. This analysis is further explored in Example 5a-d below. An optimum equilibrium between the desired effects on base content and moisture uptake, without negatively affecting the electrochemical results, is to be found between 0.5 and 0.8 wt % PVDF, independently of the tested lithium transition metal oxide composition.

Example 3

This example investigates the influence of temperature on the preparation of LiCoO₂ samples coated by polymer having a LiF interface. The example discusses the voltage profile and microstructure of a suitable LiCoO₂ to give further evidence for the conclusions of examples 1-2. The key conclusions are similar to examples 1-2: between 200-350° C. a LiF film forms. The thickness increases with temperature. Otherwise, a LiF film cannot be retained at higher temperature.

The example shows results for samples prepared by adding 1% PVDF polymer. A lithium cobalt oxide mass production sample is used as cathode precursor. Its composition is 1 mol % Mg doped LiCoO₂, having a mean particles size of 17 μm. 1000 g of this precursor powder and 10 g of PVDF powder are carefully mixed using a Hensel type mixer. The mixture is sampled to batches of 150 g each. These batches are heat treated for 9 h at temperatures ranging from 150-600° C. The resulting powder is sieved. The powders are analyzed by coin cell testing, SEM and conductivity.

Figure 7B:
FIGS. 7a & b: SEM of LCO/1% PVDF mixture heated at 300/600° C.

The SEM analysis shows an irregular coating of polymer at 150° C., becoming increasingly smooth and homogeneous as the temperature increases to 250° C. At 300° C. the surface layer starts to change, and at 350° C. a surface film is observed that seems to have inorganic characteristics, instead of a being a polymer coating. At 600° C. the surface film is damaged and well formed crystals, possibly being LiF, are created. The creation of the crystals proves that LiF does not wet the surface at higher temperature. It is seemingly impossible to achieve a LiF film by direct high temperature synthesis. FIG. 7a shows the SEM graphs of the sample at 300° C., FIG. 7b at 600° C. Note the presence of well-formed LiF crystals.

Table 3 gives a summary of the electrochemical testing measurements.

TABLE 3

Charge (QC), Discharge (QD) and Irreversible capacities (Q irr) of samples treated at different temperatures.

| Sample | Heating Temperature | QC mAh/g | QD mAh/g | Qirr % |
|---|---|---|---|---|
| LC0349 | 150° C. | 160.18 | 152.38 | 4.87 |
| LC0350 | 200° C. | 160.08 | 152.31 | 4.86 |
| LC0351 | 250° C. | 158.15 | 148.22 | 6.28 |
| LC0352 | 300° C. | 100.79 | 69.01 | 31.53 |
| LC0365 | 350° C. | 59.32 | 39.69 | 33.10 |
| LC0370 | 600° C. | 163.26 | 145.03 | 11.17 |

Figure 8:
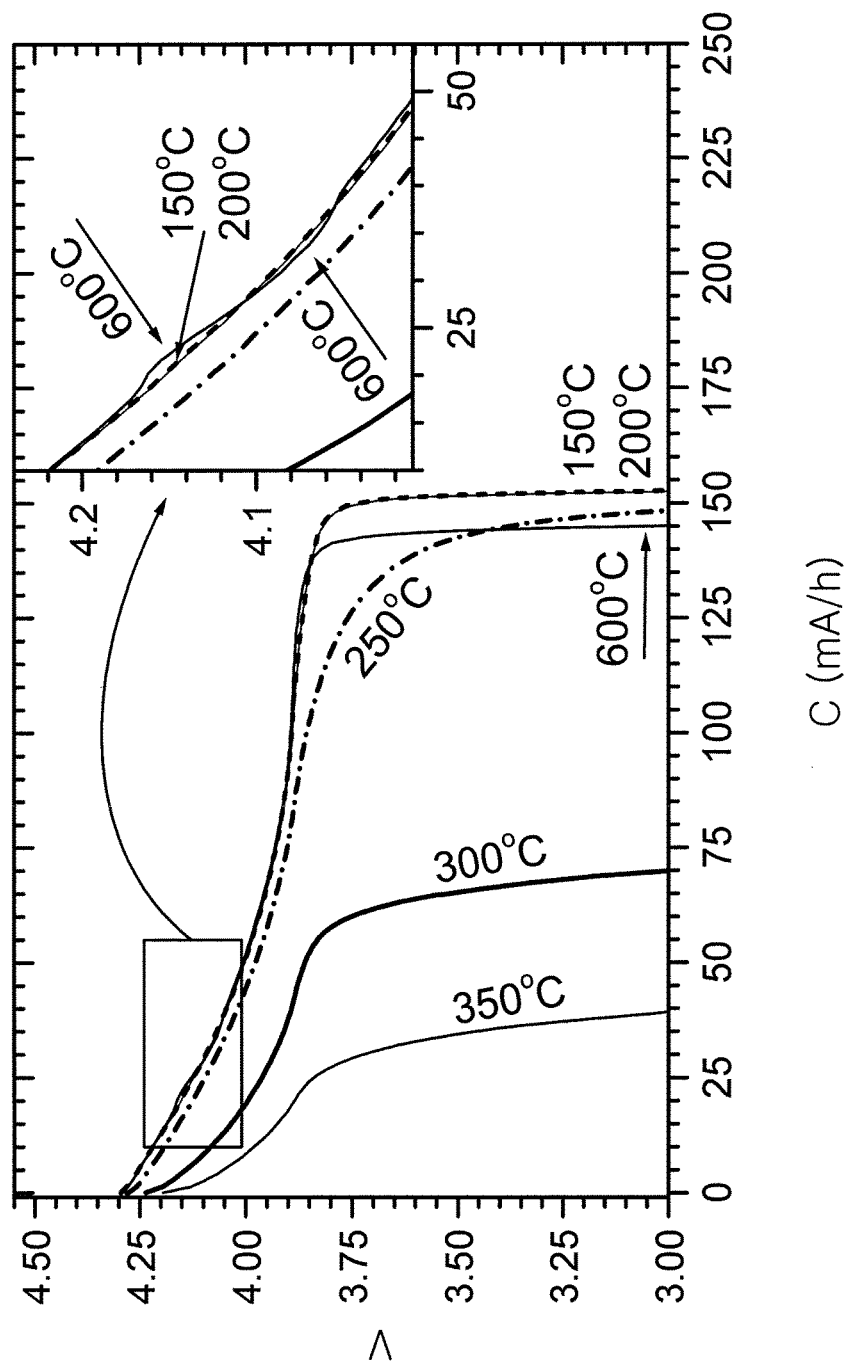
FIG. 8: Discharge voltage profile: voltage V against cathode capacity (in mAh/g) of a LCO/1% PVDF mixture heated at different temperatures.

FIG. 8 shows the discharge voltage profile (4.3-3.0V, 0.1 C rate) of the samples in Table 3 prepared with 1% PVDF at different temperature. Samples prepared at lower temperature (150° C., 200° C.) show exactly the same discharge voltage profile. The profile is similar but has slightly lower capacity (about 1% less) than the reference (data not shown) which is the untreated sample used as precursor. The capacity values refer to the actual mass of the sample (thus it includes the weight of the polymer coating). The low T samples (150, 200° C.) contain 1% PVDF coating layer, this explains the 1% lower capacity. The voltage profile is typical for LiCoO₂ with high Li:Co ratio, because no phase transition at 4.1V is detected. The 250° C. sample shows a different voltage profile, typical for a $LiCoO_2$ having a poor rate performance. The polarization is larger (voltage depression) and the end of discharge is much less square type (more rounded). This is attributed to a LiF interfacial layer formed between the polymer coating and the $LiCoO_2$ surface. This LiF layer is fully covering the surface and has low ionic and electronic conductivity, causing the low rate voltage profile.

With increasing temperature (300° C., 350° C.) the capacity deteriorates dramatically. This clearly indicates the formation of a resistive LiF layer with increasing thickness which obviously covers the whole surface. However, if the preparation temperature is increased further, at 600° C. we observe almost near full capacity, improved rate performance (not shown) and a clear phase transition at 4.1V. (Normally the 4.1V phase transition is only observed for Li deficient or stoichiometric $LiCoO_2$).

These data at 600° C. show that a resistive LiF surface layer is absent. Obviously, at elevated temperature the homogeneous LiF surface layer is destroyed and large fractions of the surface is not covered by a LiF layer anymore. The data are fully consistent with the SEM which shows a damaged surface and the creation of larger LiF crystals.

Example 3 demonstrates that at temperatures above the melting point of PVDF (140-170° C.) a homogeneous polymer surface film forms. However, the temperature needs to be increased to more than 200° C. and preferably 250° C. before the reaction between polymer and cathode surface—creating the desired interfacial LiF film forms. However, if the temperature is too high, the protection layer is not active anymore. The LiF surface film then detaches from the surface and LiF crystals form. Example 3 also shows that the results achieved on a 1% Mg doped $LiCoO_2$ sample are comparable to the LNMO sample of Example 1.

Example 4

Example 4 investigates the influence of temperature on the preparation of LNO type samples coated by polymer having a LiF interface.

The example shows results for samples prepared by adding 0.3 and 1% PVDF polymer. A $LiNi_{0.8}Co_{0.15}Al_{0.05}O_2$ sample, with 0.15 mol % S and 500-1000 ppm C, has been prepared from an alumina containing mixed transition metal precursor and LiOH in flowing oxygen at 5 kg scale in a pilot plant. The PVDF treatment was done similar as in examples 1 and 2. Table 4 summarizes the samples, preparation and results.

The table shows that the PVDF treatment improves moisture stability and, at T=250° C. the initial base content is lowered considerably. At 150° C., compared to no PVDF, no decrease of base is observed, but at higher T, due to the consumption of base to form LiF the base content decreases. For this LNO composition, the moisture content is at its lowest for a treatment at 350° C. Compared to the untreated sample the rate of base increase during humidity exposure slows down. Similar as in examples 1-3 the capacity and rate deteriorates at higher T if 1% PVDF is used, whereas using 0.3% PVDF allows achieving good electrochemical results over the whole temperature region.

Example 5a-d

This example reproduces the results of Examples 1 and 2 for larger scale samples. These samples are additionally tested in polymer type full cells. In all Examples mass production LNMO (M=$Ni_{0.5}Mn_{0.3}Co_{0.2}$) with Li:M of approx. 1.0 is used as precursor. The precursor further contains 0.145 mol % S and 142 ppm Ca.

Example 5a: 1 wt % PVDF at 250° C.

200 g mass production LNMO and 18 g PVDF powder are pre-mixed in 4 batches using a coffee grinder. The mixture is added to 1.6 kg of LNMO and mixing continues using a Hensel type mixer using a 2 L vessel. The mixture is heat treated at 250° C. in a convection oven for 5 h, followed by sieving.

Example 5b: 1 wt % PVDF at 250° C. (Larger Sample)

15 kg of cathode precursor powder and 150 g of PVDF powder are carefully mixed using a pilot plant ribbon blender. The powder mixture is heated for 5 h at 250° C. followed by grinding and sieving.

Example 5c: 0.3% PVDF at 300° C.

Basically similar as the 1.8 kg sample of Example 5a with the exception that the heat treatment temperature is 300° C. and less PVDF (5.4 g) is used. Premixing was done with 2 batches of 50 g sample with 2.7 g PVDF.

Example 5d: 0.3% PVDF at 350° C.

Similar as example 5c with the exception that the heat treatment temperature was 350° C.

TABLE 4

Samples, preparation and obtained results for high nickel cathode materials

| | Preparation | | As prepared | | | | $H_2O$ exposed | |
|---|---|---|---|---|---|---|---|---|
| Sample | PVDF wt % | T ° C. | Q (0.1 C) mAh/g | Q(irr) % | Rate (2 C) % | Base µmol/g | Base µmol/g | $H_2O$ ppm |
| QX0101 | 0.0 | 250 | 194.82 | 9.99 | 88.65 | 337.5 | 510.5 | 1836 |
| QX0102 | 0.3 | 150 | 194.07 | 10.04 | 88.80 | 364.7 | 423.2 | 1513 |
| QX0103 | 0.3 | 250 | 192.43 | 10.67 | 88.11 | 282.7 | 445.5 | 1529 |
| QX0104 | 0.3 | 350 | 192.34 | 10.74 | 87.51 | 251.5 | 362.2 | 1170 |
| QX0105 | 1.0 | 150 | 191.53 | 10.22 | 88.74 | 339.1 | 387.4 | 1248 |
| QX0106 | 1.0 | 250 | 188.88 | 11.88 | 87.96 | 226.2 | 334.0 | 1076 |
| QX0107 | 1.0 | 350 | 185.32 | 13.55 | 87.13 | 182.7 | 293.6 | 1071 |

Tests were performed in a similar manner as in example 1-3, additionally 800 mAh wound pouch type cells are assembled and tested (such type of cell is described in e.g. the prior art of U.S. Pat. No. 7,585,589). Table 5 summarizes the results.

TABLE 5

Larger size samples, preparation and test results

| Sample | Preparation | Base µmol/g Before | Base µmol/g After | Moisture ppm After | QD C/10 mAh/g | Rate 2 C (%) | Volume Unit cell $A^3$ | Size nm |
|---|---|---|---|---|---|---|---|---|
| 5a EX0235 | 1%, 250° C. | 39.2 | 39.1 | 213 | 165.5 | 87.3 | 33.8676 | 132 |
| 5b EX0297 | 1%, 250° C. | 42.2 | 42.0 | 210 | 163.3 | 88.1 | 33.8685 | 147 |
| 5c EX0305 | 0.3%, 300° C. | 28.6 | 32.5 | 464 | 166.8 | 87.2 | 33.8711 | 145 |
| 5d EX0295 | 0.3%, 350° C. | 28 | 35.5 | 335 | 168.4 | 86.6 | 33.8787 | 147 |
| LNMO | 0% | 59.9 | 73.9 | 572 | 167.25 | 87.64 | 33.8650 | 147 |

QD: discharge capacity;
Rate: in % vs 0.1 C,
Base: before and after humidity chamber exposure.

The table allows for the following conclusions:

1) 1% @ 250° C. sample: It has the best moisture stability. The base does not increase during humidity exposure and the moisture content after humidity exposure is very low. However, the LiF film is thin, and the base content is only reduced by approx. 30%.

2) 0.3% @ 300° C. sample: Caused by the thinner polymer film the moisture stability is worse than that of 1%®250° C., otherwise, the total base is low, less than 50% of the reference. This indicates that the LiF is better developed and the decomposition of the polymer has consumed most of the base. We observe a slight decrease of unit cell volume, consistent with the extraction of some lithium from the bulk.

3) 0.3%® 350° C. sample: the moisture content is better than at 300° C.

Table 6 summarizes the pouch cell testing results. A dramatic decrease of swelling after high temperature storage (4 h, 90° C.) is observed. The swelling is the ratio of cell thickness after 4 h measured when the cell is still hot (90° C.) compared to the thickness measured before the test (cold). Several further tests with differently treated samples were performed, but only the PVDF treated samples show a dramatically reduced swelling, much lower than the typical obtained figures of 40-50%. We furthermore observe that all PVDF treated cells pass the overcharge test which indicates improved safety performance. Overcharge is done at 700 mA until 5.5V is reached. Passing means that no fire or smoke event happens. Nailing test is done using a 2.5 mm diameter sharp nail at a speed of 6.4 mm per second. Passing means no smoke or fire.

TABLE 6 results of full cell testing using LNMO.

| Sample | Preparation | Overcharge 1 C, 5.5 V Pass | Nail test 4.25 V Pass | Swelling (%) |
|---|---|---|---|---|
| 5a EX0235 | 1%, 250° C. | 2/2 | 5/5 | 26.6 |
| 5b EX0297 | 1%, 250° C. | 2/2 | 4/5 | 20.8 |
| 5c EX0305 | 0.3%, 300° C. | 2/2 | 5/5 | 25.1 |
| 5d EX0295 | 0.3%, 350° C. | 1/1 | 3/4 | 23.4 |
| LNMO | 0% | 0/2 | 3/4 | 46.3 |

Example 6

Example 6 is a so-called 'blank' example, and simulates a possible reaction that happens between the molten PVDF covering the surface of the particle and the LiOH type base present on the particles' surface. By using a Differential Scanning calorimetry (DSC) method, this example shows that polymer reacts with lithium containing base at temperature of about 50° C. above the melting point of Kynar. This reaction is necessary to create the desired inner LiF layer.

Figure 9:
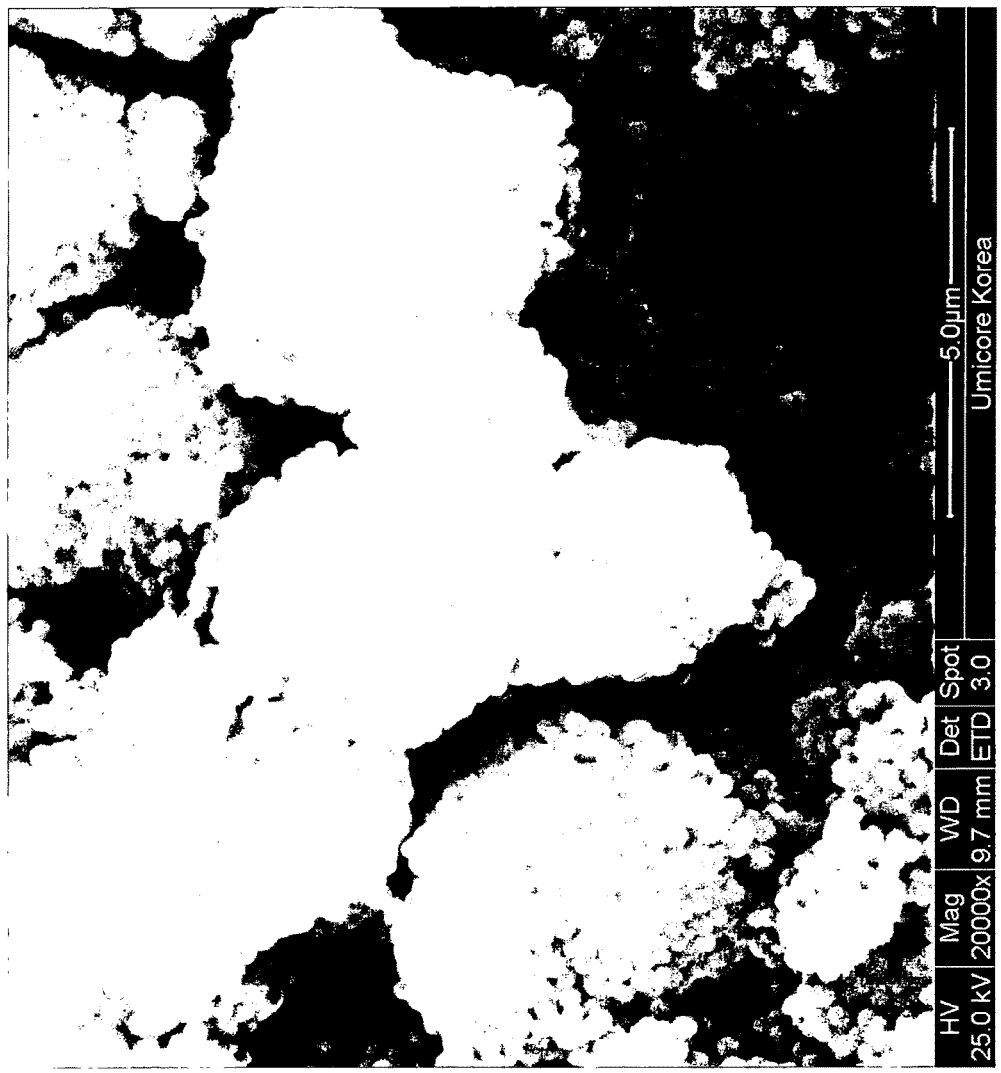
FIG. 9: SEM picture of Kynar® 2801 sample

A Kynar® 2801 sample from Arkema (received as fine powder and having a melting point—as reported by the producer—of 142° C.) and a LiOH*H$_2$O sample are each jet milled until their average size (D50) is below 2 µm. FIG. 9 gives a SEM picture of the Kynar® sample, showing that it is composed of agglomerated ball-shaped primary particles having an average particle size of between 0.2 and 0.5 µm.

The resulting fine Kynar powder, and fine particles of LiOH*H$_2$O are then mixed in a 2:1 mass ratio. This corresponds to a molar ratio F:Li of fluorine in the Kynar to Li in the hydroxide of approx. 2.62. Hence, even if all Li reacts with polymer, there is still an excess of unreacted polymer. This mixture is heated to 150, 200 and 250° C. The mass loss is recorded and X-ray diffraction is measured for the heated blends.

The blend, and the Kynar reference are investigated by DSC. The samples are inserted into stainless steal DSC cans which are hermetically sealed. The heat flow is measured during heating, using a temperature rate of 5K/min from room temperature to 350° C.

Figure 10:
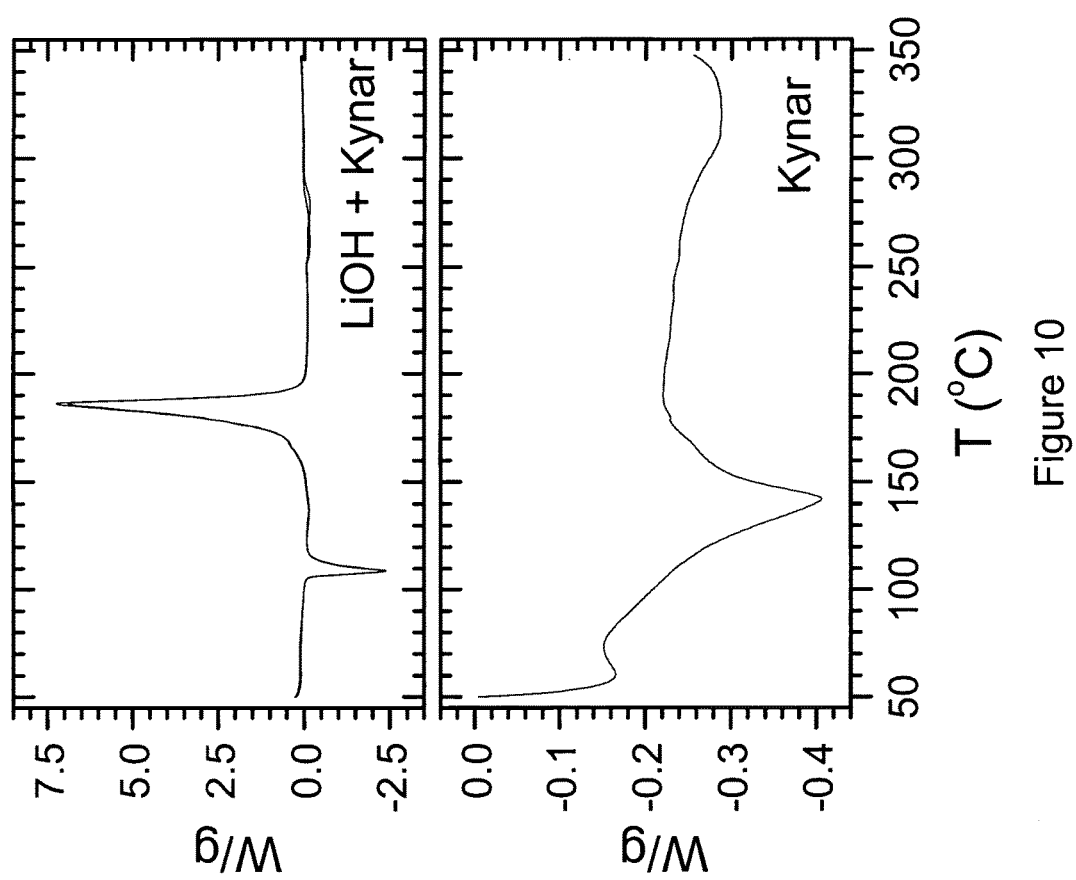
FIG. 10: DSC measurements of Kynar® 2801 and a mixture of Kynar and $LiOH.H_2O$, showing heat flow (W/g) against temperature.

FIG. 10 shows the obtained DSC results (heat flow vs. temperature; top: blend of Kynar and LiOH*H$_2$O; bottom: pure Kynar): the minimum heat flow (most endotherm) for Kynar is achieved at 142° C., which is identical to the melting point of 142° C.

The curve obtained during heating of the blend is completely different. First, a sharp endothermic event is observed with minimum heat flow at 109.1° C. This is the release of moisture LiOH*H$_2$O→LiOH+H$_2$O. Then a strong exothermic event is observed. The maximum heat flow is observed at 186.2° C. It is assumed that at this temperature PVDF in contact with Li base and high pressure moisture decomposes and LiF (and possibly carbon) is formed. The DSC cans are hermetically sealed so no further reaction takes place. In air however at higher temperature the polymer will continue to decompose, as will be shown in Example 7.

Example 7

This example is another 'blank' example, and simulates a possible reaction that happens between the molten PVDF covering the surface of the particle and the LiOH type base present on the particles' surface. The example shows that in air at temperatures above 200° C. a reaction between base and PVDF happens, which causes the creation of decomposed polymer and possibly carbon.

The sample blend as in example 6 (Kynar® 2801 sample from Arkema & jetmilled of LiOH*H$_2$O in a 2:1 mass ratio) is used. The blend is heated to 150, 200 and 250° C. in air for 5 h. The mass loss is recorded and X-ray diffraction is measured for the heated blends. Please note that example 6 is a closed system (high pressure moisture) whereas example 7 is for an open system (where possibly most moisture evaporates).

Table 7 summarizes the results, where 'X-ray' lists the observed compounds.

TABLE 7

Heat treatment of LiOH - Kynar blends in air

| Temp. ° C. | X-ray Phase indexing | Mass Loss wt % | Color | Conductivity | Solubility in NMP |
|---|---|---|---|---|---|
| 150 | LiOH, Li$_2$CO$_3$ PVDF, LiF (traces) | 13.6 | Very Light yellowish brown | Insulating Could not be measured | Soluble |
| 175 | LiOH, Li$_2$CO$_3$ PVDF, LiF (traces) | 14.7 | Light Brown | Insulating Could not be measured | Soluble |
| 200 | LIF, Polymer (undefined) | 56.6 | Black | Insulating Could not be measure | Black precipitate |
| 250 | LiF, Polymer (undefined) | 58.7 | Black | 3*10$^{-7}$ S/cm | Black precipitate |

At 150° C. and 175° C. the blend has basically not reacted. The color is white-yellowish and the electric conductivity is zero. A mass loss of 13-15 wt % is observed, mostly originating from the reaction LiOH*H$_2$O+PVDF→LiOH+PVDF. The blend is fully soluble in NMP. The X-ray diffraction pattern shows LiOH and LiOH*H$_2$O, Li$_2$CO$_3$, polymer and traces of LiF.

At 200° C. the blend reacts. The resulting color is black. A much larger mass loss is observed. The conductivity could not be measured (too low). The blend cannot be fully dissolved in acetone, and black particles remain. The X-ray diffraction pattern shows LiF and polymer. The polymer has a different diffraction pattern than pure PVDF.

At 250° C. a stronger reaction occurs. The mass loss is 58.7 wt %. The blend shows an increased conductivity of 3*10$^{-7}$ S/cm. The blend cannot be fully dissolved in acetone, and black particles remain. The X-ray diffraction pattern shows LiF and polymer, the polymer having a different diffraction pattern than pure PVDF.

Figure 11:
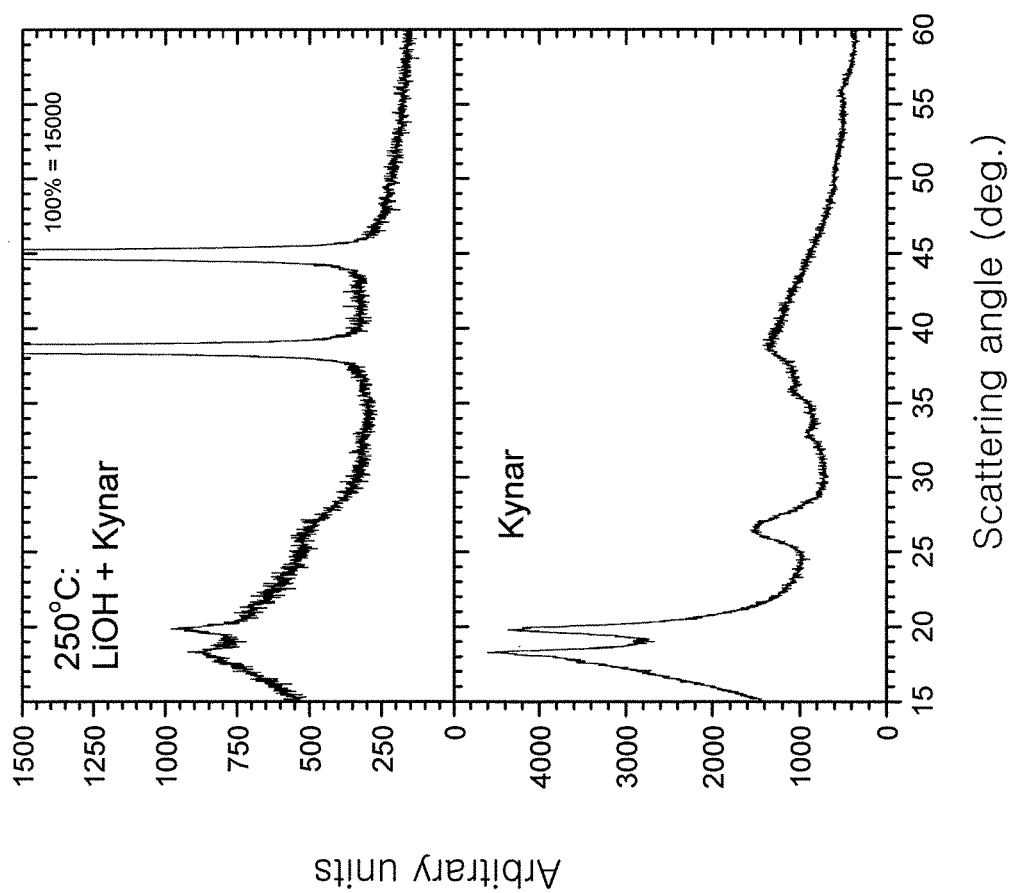
FIG. 11: X-ray diffraction patterns (arbitrary units, against scattering angle (deg.)) of reference PVDF (bottom) and LNO/PVDF mixture treated at 250° C. (top).
Figure 12:
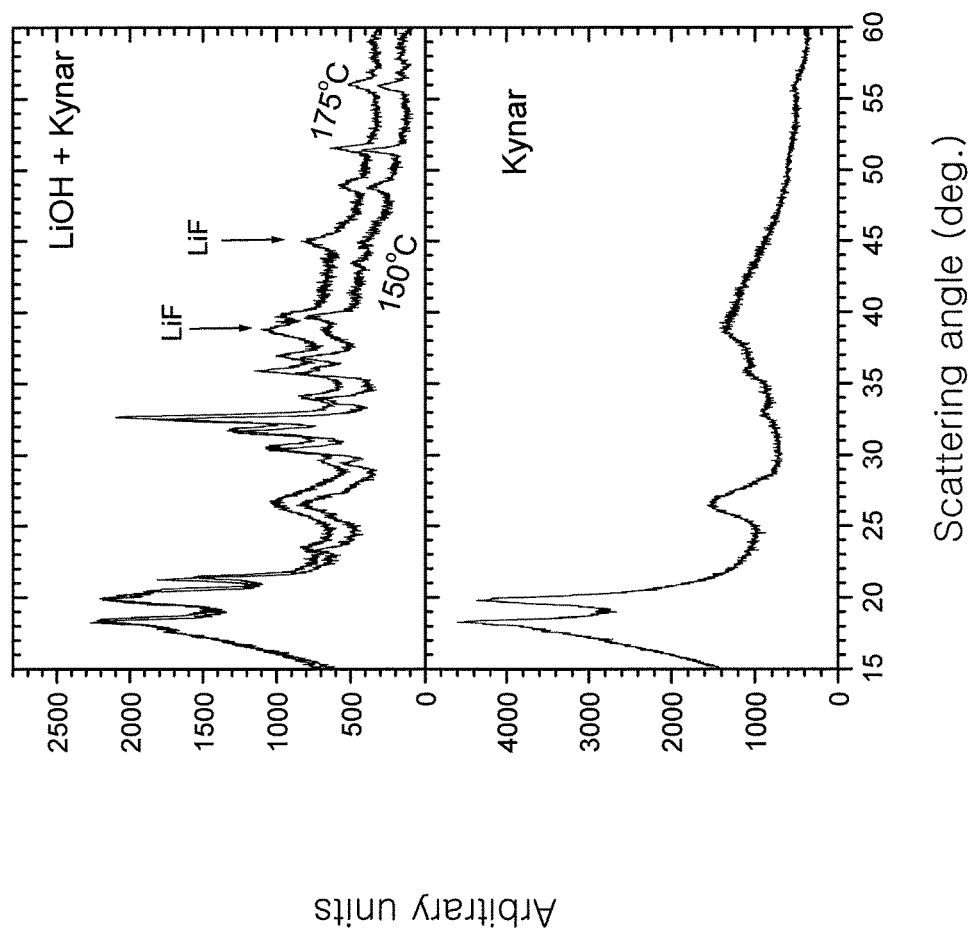
FIG. 12: X-ray diffraction patterns of reference PVDF (bottom) and LNO/PVDF mixture (top) treated at 175 (top curve)/150° C. (bottom curve).

FIGS. 11 and 12 show some of the collected X-ray diffraction patterns: FIG. 11 shows a reference Kynar (PVDF) sample (below) and a sample treated at 250° C. (top), FIG. 12 at 150 (lower curve of top figure) and 175° C. (upper line of top figure), and again the reference PVDF on the lower figure. In FIG. 11 the two high intensity peaks of the top figure (only 10% of full scale shown) are LiF. The broad hump at 15-30 deg. is 'undefined' polymer, remaining from PVDF but having a clearly different X-ray pattern than the reference. The pattern of a blend after a heat treatment at 200° C. (not shown) is very similar. In FIG. 12 the X-ray diffraction pattern of PVDF precursor (=reference) and of the blend after 150 and 175° C. heat treatment show that basically PVDF does not react, and the pattern of PVDF remains. At 150° C. tiny traces of LiF can be detected. At 175° C. LiF becomes a minor impurity. Diffraction peaks of LiF are marked by an arrow. Other peaks can be indexed to lithium salts such as Li$_2$CO$_3$ and LiOH.

Example 7 shows that in air, at about 200° C., i.e. about 50K higher temperature than the melting point, a reaction between LiOH and PVDF takes place which creates LiF and a modified polymer. The example confirms the model that the decomposition of PVDF and the formation of the LiF layer on a lithium transition metal oxide powder should be caused by the reaction of PVDF with lithium base.

Example 8

This experiment is designed to prove the following:

1) at low heating temperature no LiF layer is present (PVDF just covers the particle but no LiF reaction layer is formed)
2) at the heating temperature according to the invention a reaction between PVDF and cathode is initiated (resulting in a thin interfacial LiF layer)
3) at too high temperature a thick LiF film has formed (all PVDF has been consumed by reacting with the cathode to form LiF).

LiF has a small solubility in water (about 1.5 g or so per L). On the other hand, PVDF is insoluble. Thus it is expected that after immersing heat treated product, the LiF dissolves, and any dissolved fluorine ions can be detected by liquid chromatography. However, as PVDF containing samples are hydrophobic, it is however not sure that all LiF will be accessible by water. Since PVDF is highly soluble in acetone or NMP but LiF is not, samples can also be prepared where the PVDF is removed by dissolution in NMP or acetone, to ensure that water can access and dissolve the LiF.

The following samples were tested:

1) A sample as prepared—without washing—the same or similar samples as described or analyzed in Example 1,
2) A sample washed in a small amount of acetone and decanted,
3) A sample washed in NMP and decanted.

The liquid chromatography (LC) procedure is as follows:

1) weigh 1 g of sample in a glass Erlenmeyer flask of 300 mL;
2) add 100 mL of doubly de-ionized water;
3) add a glass stirring bar and stir for 1 hour;
4) filtrate over microfilter Millipore 0.45 μm;
5) measure filtrate on ion-chromatograph (along with procedure blanks).

Table 8 summarizes samples, preparation and results

TABLE 8

Samples, Preparation and summary of results:

| | Preparation | | After- | Analysis | |
|---|---|---|---|---|---|
| Sample | % PVDF | Heat T ° C. | Treatment No wash | F(−) (wt %) | Fraction (%) |
| EX0121 | 1 | 150 | No wash | 0.010 | 0.016 |
| EX0194 | 1 | 250 | No wash | 0.064 | 0.103 |
| EX0295 | 0.3 | 350 | No wash | 0.160 | 0.860 |
| EX0121C | 1 | 150 | Acetone 3x | 0.010 | 0.016 |
| EX0194C | 1 | 250 | Acetone 3x | 0.064 | 0.103 |
| EX0295C | 0.3 | 350 | Acetone 2x | 0.162 | 0.871 |
| EX0120C | 0.3 | 150 | NMP 3x | 0.006 | 0.032 |

TABLE 8-continued

Samples, Preparation and summary of results:

| | Preparation | | After-Treatment | Analysis | |
|---|---|---|---|---|---|
| Sample | % PVDF | Heat T °C. | No wash | F(−) (wt %) | Fraction (%) |
| EX0126C | 0.3 | 250 | NMP 3x | 0.054 | 0.290 |
| EX0160C | 0.3 | 350 | NMP 3x | 0.158 | 0.849 |

Fraction %: the % of PVDF that has reacted, as can be deduced from the amount of F found.
The F(−) analysis results indicate 3 different levels in the wash water: 0.006 to 0.010 wt %, indicating that nearly no LiF is present; 0.054 to 0.064 wt %, indicating the presence of a LiF layer of nearly the same thickness; and finally 0.158 to 0.162 wt %, indicating nearly all of the PVDF has reacted, as will be explained below.

Figure 13:
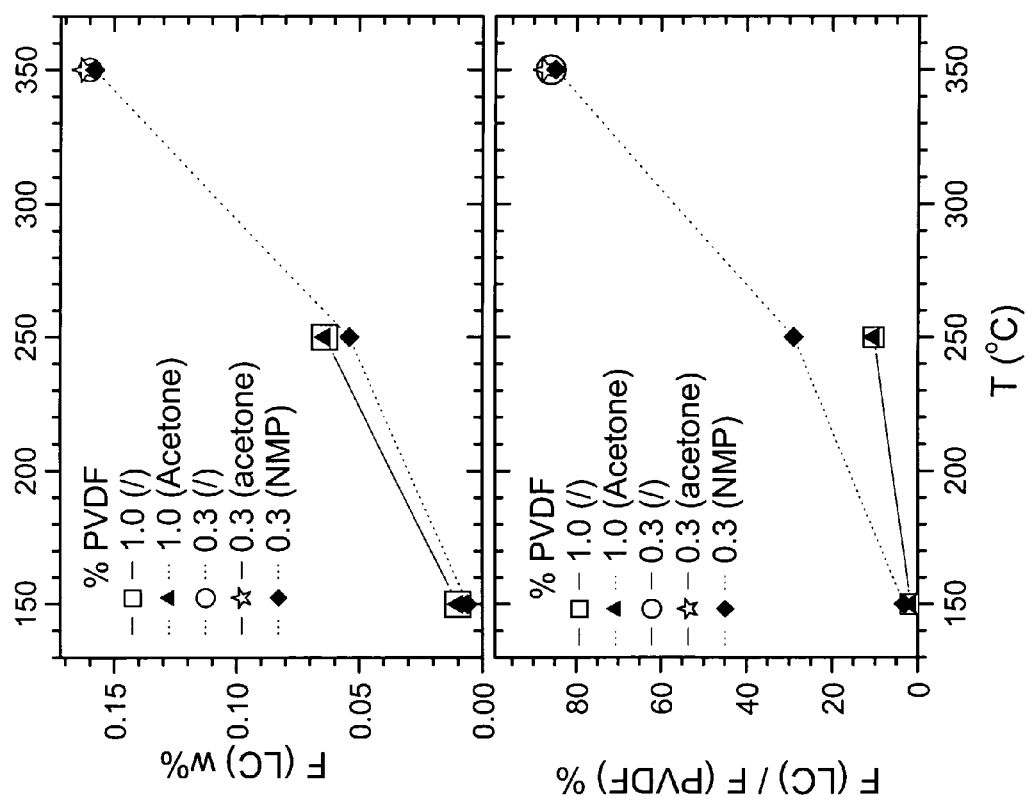
FIG. 13: Top: Fluorine (g/g of sample) detected by chromatography versus heat treatment temperature of LNMO/PVDF mixture. Bottom: Calculated fraction (g of fluorine relative to fluorine in PVDF) calculated from the chromatography data mixtures versus heat treatment temperature of LNMO/PVDF.

The results are also shown in FIG. 13. The upper panel shows the wt % of fluorine detected by chromatography. The lower panel shows the fraction of dissolved F detected by chromatography calculated from the above data.

First we observe that washed (in NMP or acetone) and unwashed samples give the same result. Compare for example EX0121 and 0121C. Whereas PVDF offers an efficient protection to moisture uptake in the humidity exposure test, immersion in water enables underlying LiF to be dissolved.

Secondly, the ionic chromatography clearly proves that at 150° C. practically no (and in any case insufficient) LiF is present. See for example EX0121 and 0121C. Thus the polymer has not reacted with the surface of the treated cathode product. A PVDF film may cover the particle but the protecting LiF film does not exist. At 250° C. a fraction of the PVDF has reacted, for example for EX0194a 0194C. The total amount of LiF formed (=amount of reacted PVDF) does nearly not depend on the initial amount of PVDF, as is deduced from comparing EX0194C and 0126C. We conclude that the reaction rate is limited by the surface area of the cathode and by the availability of surface base. A large excess of unreacted PVDF covers the particle, but an interfacial layer of LiF has formed.

At 350° C. all PVDF has reacted. In an ideal experiment we would detect as much fluorine by LC as has been added to the sample in the form of PVDF. It is assumed that the obtained result for the fraction of detected fluorine (84-88%) is within the experimental systematic error and thus we conclude that at 350° C. all PVDF has decomposed.

It can be said that for the treatment at 250° C., the amount of F detected is surface limited, i.e. dependent on the quantity of base Li, whilst for 350° C. the amount is possibly PVDF limited, i.e. dependent on the initial amount of PVDF.

Example 9

This example describes the investigation of PVDF-treated cathode material using X-ray Photoelectron Spectroscopy (XPS) to investigate the decomposition of PVDF and the formation of LiF as a function of temperature. The example shows results for selected samples (EX0124, EX0127, EX0161) of Example 1 prepared by adding 1% PVDF and treatment at 3 different temperatures: 200° C., 250° C. and 350° C.

The experiment is designed to prove that:
1) Full decomposition of the PVDF coating is obtained by prolonged heating at high temperature (~350° C.).
2) With increasing temperature an increasingly thick LiF layer is formed. The fluorine in this layer is coming from the PVDF and the Li in this layer is coming from the surface base present on the cathode particle surface.

The results of the C, F and Li spectra are summarized in Table 9.

TABLE 9

Overview of apparent atomic concentrations (at %) measured at the surface after deconvolution of the C 1s, F 1s and Li 1s spectra into their different contributions.

| | | C 1s | | | | F 1s | | Li 1s | |
|---|---|---|---|---|---|---|---|---|---|
| | | | | eV | | | | | |
| Sample | T 1% PVDF | 284.8 C—H | 286.7 C—O | 289.2 —$CO_3$ | 291.1 $CF_2$—$CF_2$ | 686.7 F-org | ~685 LiF | ~55 $Li^+$ | $Li^+$/LiF ratio |
| EX0124 | 200° C. | 16.6 | 3.2 | 12.5 | 2.5 | 27.9 | 2.6 | 9.2 | 3.5 |
| EX0127 | 250° C. | 18.3 | 4.8 | 11.0 | 4.6 | 31.3 | 1.8 | 8.1 | 4.5 |
| EX0161 | 350° C. | 4.1 | 1.1 | 1.1 | 0.3 | 4.2 | 25.7 | 26.5 | 1.0 |

Conclusions for Table 9:
1 C 1s:
  1.1 Disappearance (=decomposition) of PVDF at 350° C. shown by decrease in $CF_2$—$CF_2$-peak at 291.1 eV. PVDF (pristine or partly decomposed) remains present at temperatures below this temperature.
  1.2 $Li_2CO_3$ observed at the particle surface by $CO_3$-peak at 289.2 eV. At 350° C., $Li_2CO_3$ is removed. This can be explained by the formation of LiF in which the $Li_2CO_3$ present at the surface of the particles is used as the source of Li.
2 F 1s:
  2.1 Disappearance (=decomposition) of PVDF at 350° C. shown by decrease in F-org-peak at 686.7 eV. PVDF (pristine or partly decomposed) remains present at temperatures below this temperature.
  2.2 Formation of LiF at 350° C. shown by LiF-peak at ~685 eV.
  2.3 The formation of LiF is directly linked to the decrease in $Li_2CO_3$ indicating the use of $Li_2CO_3$ during this formation. The formation of LiF at lower temperatures cannot be concluded due to masking of this LiF layer by the PVDF overlayer (knowing that XPS has a limited penetration depth). Therefore, in Example 8, the PVDF overlayer is removed by solvent wash.
3 Li 1s:
  3.1 Decrease of $Li^+$/LiF ratio closer to 1 when temperature is increased and more LiF is formed. This clearly shows that at 350° C. the formation of LiF is complete and all Li at the surface is present as LiF.

The XPS data clearly support the model that
1 Full decomposition of the PVDF coating is obtained by prolonged heating at high temperature (~350° C.).
2 With increasing temperature an increasingly thick LiF layer is formed. The F in this layer is coming from the PVDF and the Li in this layer is coming from the surface base present on the cathode particle surface. (The surface base consists of lithium salts like $Li_2CO_3$ and LiOH. The $Li_2CO_3$ is a major part of the surface base and can be monitored by XPS) specifically:

2.1 at low T (150-200° C.) PVDF is still present as a coating and there is almost no LiF present. All surface base ($Li_2CO_3$) is still present on the surface of the cathode material.

2.2 at elevated T (250° C.) a reaction between PVDF and the $Li_2CO_3$ has started (resulting in a thin interfacial LiF layer). PVDF is also still present as a coating.

2.3 at high T (350° C.) a thick LiF film has formed: over time the PVDF fully decomposes and its F is consumed by reacting with the available $Li_2CO_3$ at the particle surface, to form LiF.

Example 10

This example investigates a PVDF-coated cathode material using X-ray Photoelectron Spectroscopy (XPS) to investigate the decomposition of PVDF and the formation of LiF as a function of temperature. This example gives results for 0.3% PVDF and treatment at 3 different temperatures, 150° C., 250° C. and 350° C. Selected samples of Example 2: EX0120, EX0126 and EX0160 are investigated.

XPS is a surface sensitive technique with limited penetration depth. In Example 9 the evolving underlying LiF interface was masked by the polymer surface and could be detected only for the high T sample where the polymer has decomposed. In the present example a washing step is applied to remove remaining PVDF and more clearly visualize the underlying LiF layer.

Samples EX0120, EX0126 and EX0160 are washed using the following procedure:
1) 5 g in 20 ml NMP, shaking 1 h;
2) diluting with 40 ml acetone;
3) decanting 2 times, drying.

Since polymer is soluble in NMP and acetone, but LiF has practically no solubility, we assume that polymer is removed and the underlying LiF is accessible for XPS analysis.

The results of the C, F and Li spectra are summarized in Table 10.

Figure 14A:
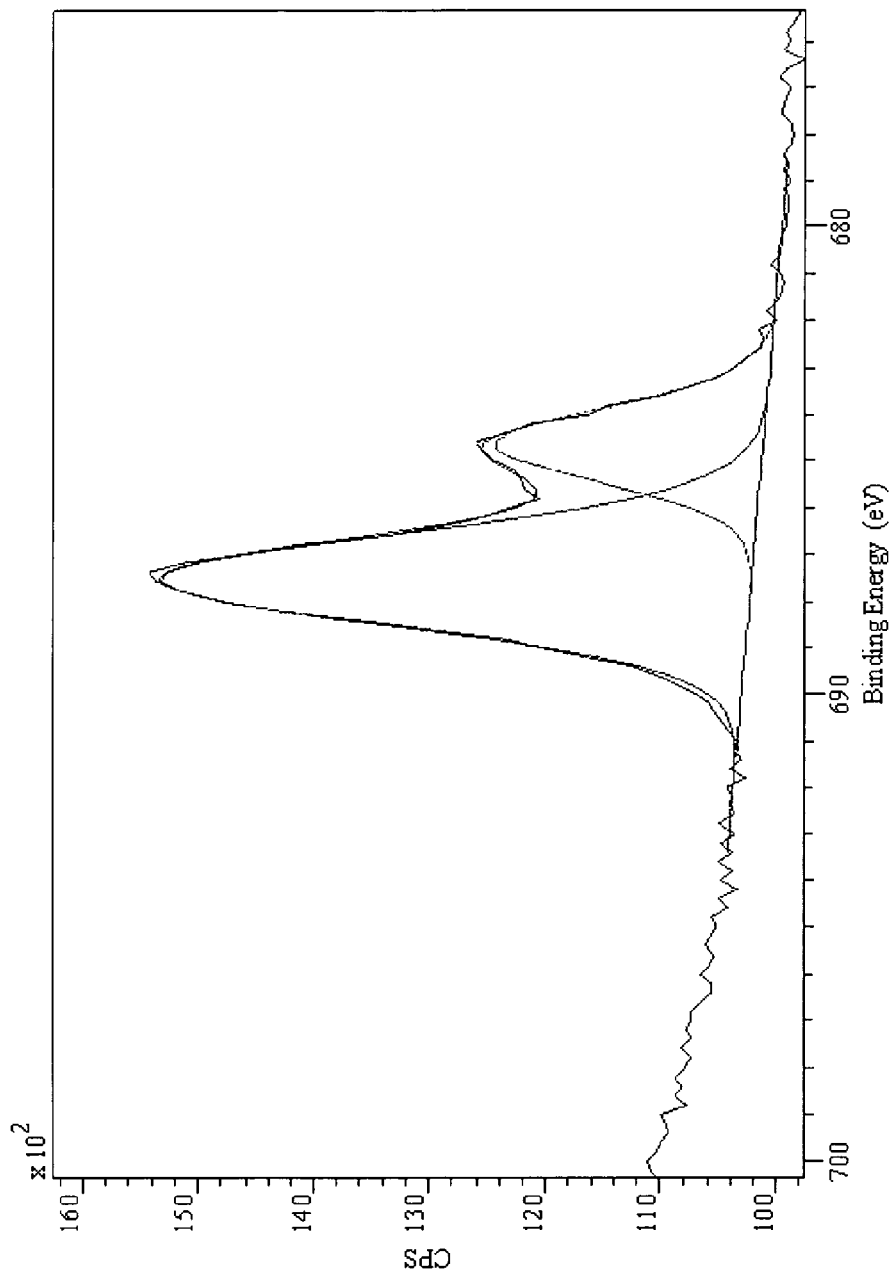
FIG. 14a-c: XPS narrow scan spectrum of the F 1s subregion showing the deconvolution into 2 F contributions: organic F at 687.5 eV and $F^-$ in LiF at 684.7 eV.
Figure 14B:
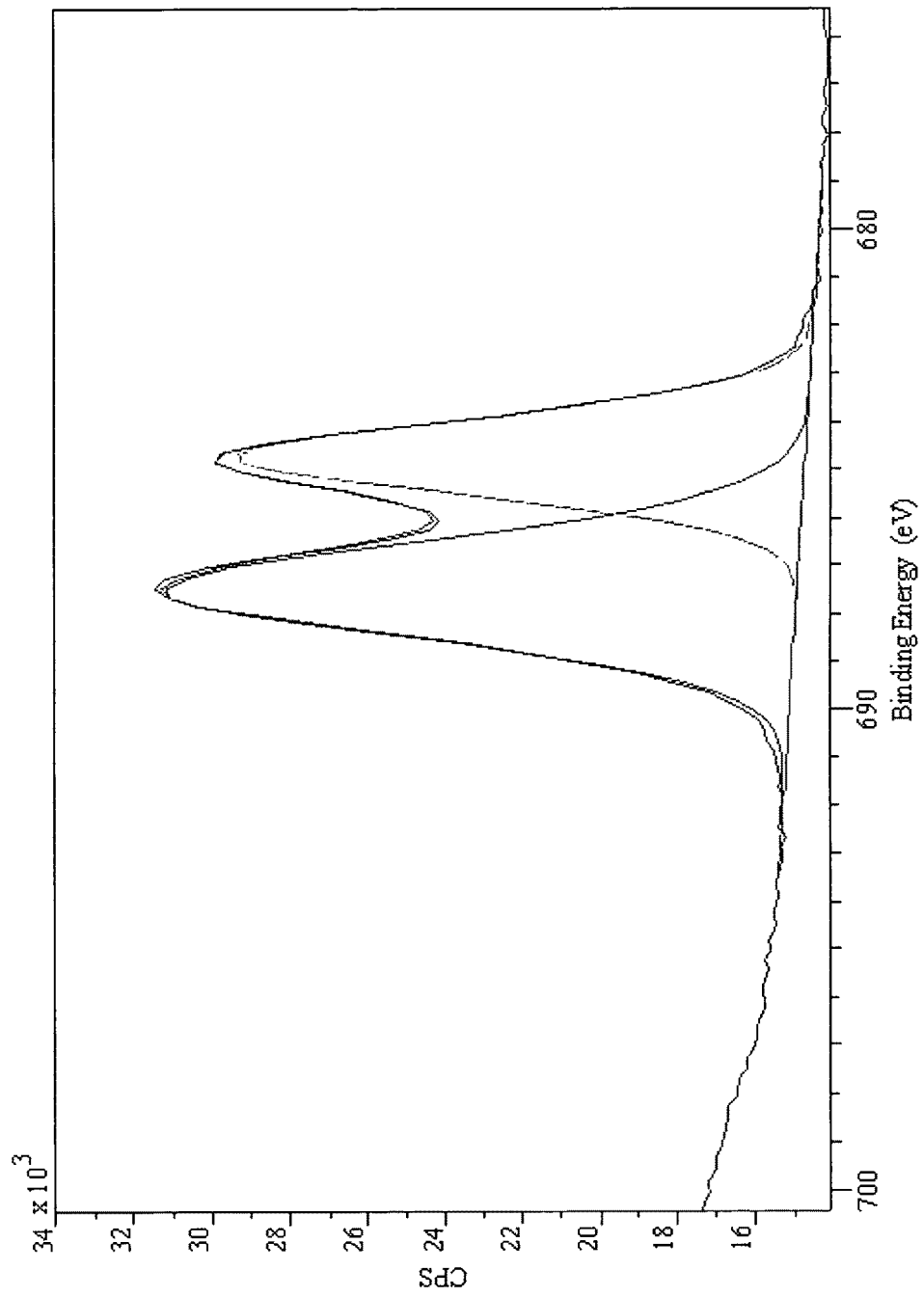
Figure 14C:
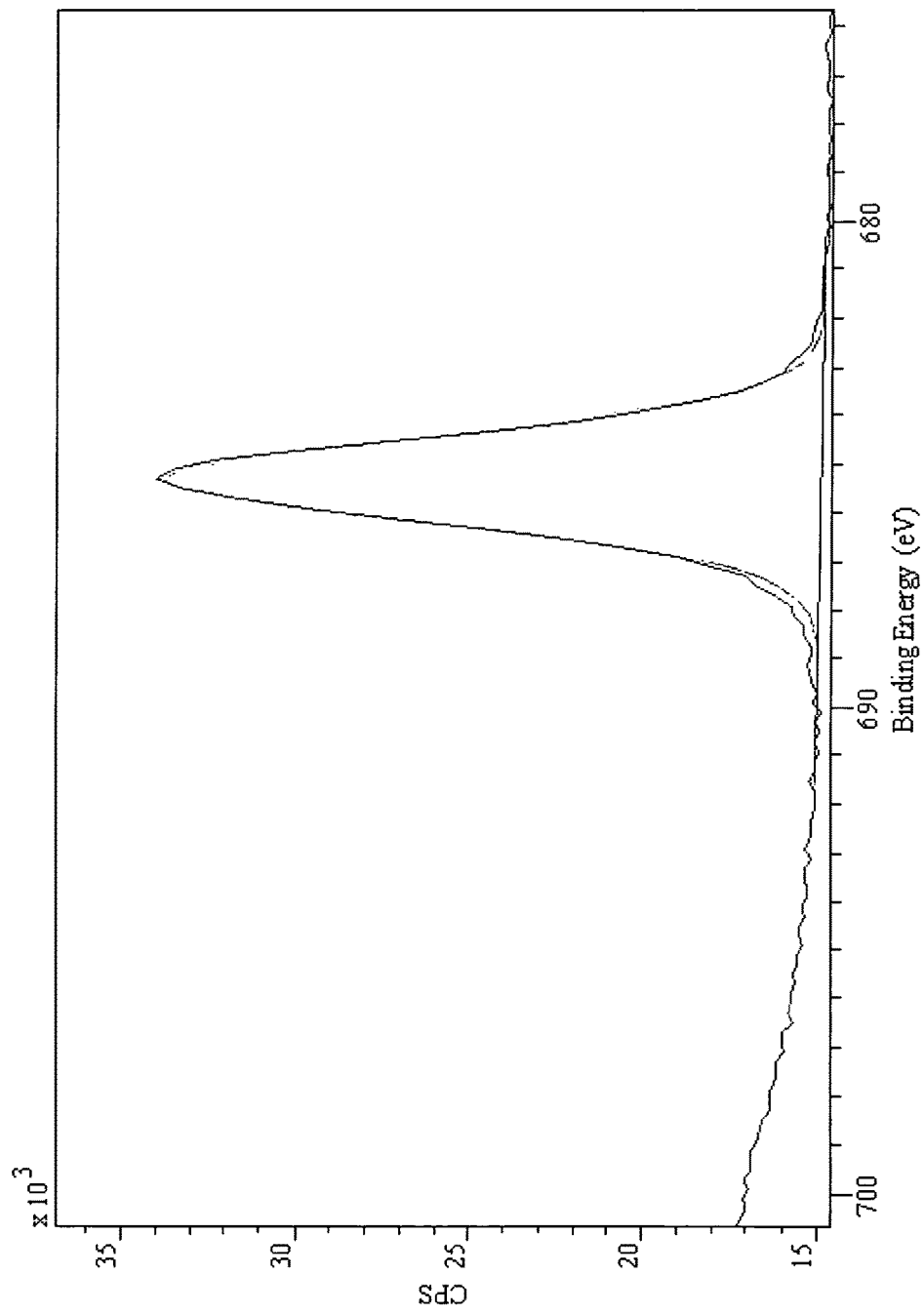

FIG. 14a shows the F1s spectrum at 150° C., 14b at 250° C. and 14c at 350° C. Counts per seconds (CPS) is plotted against Binding Energy (eV).

observed (due to complete decomposition and conversion into LiF).

1.2 $Li_2CO_3$ observed at the particle surface by $CO_3$-peak at 289.7 eV. Direct link between removal of $Li_2CO_3$ and increase in temperature is explained by PVDF that is converted into LiF. In this process, the $Li_2CO_3$ present at the surface of the particles is used as the source of Li.

2 F 1s:

2.1 The increasing formation of the LiF layer with increasing temperature is clearly shown by the increase of the typical LiF peak at 684.7 eV (see FIG. 13).

2.2 The formation of LiF is directly linked to the decrease in $Li_2CO_3$ indicating the use of $Li_2CO_3$ during this formation.

3 Li 1s:

3.1 Decrease of Li+/LiF ratio closer to 1 when temperature is increased and more LiF is formed. This clearly shows that at 350° C. the formation of LiF is complete and all Li at the surface is present as LiF. At 250° C. there are still some small amounts of other Li-species present such as Li2CO3. At 150° C. there are mainly the other Li-species present and almost no LiF.

LiF Thickness:

LiF thickness calculations are based upon standard exponential attenuation of the photoelectron intensity as a function of traveled distance as described by van der Marel et al. in *Journal of Vacuum Science and Technologies A*, 23 (5) 1456-1470 (2005). It is assumed that the layer structure of the present samples is as follows: bulk $MnO_x$, $CoO_x$, $NiO_x$, C in —$CO_3$ and $Li^+_{rest}$/Li and $F^-$ in LiF/organic C, organic F and O-org and that the LiF forms a homogeneous layer.

LiF thickness increases as a function of temperature: at 150° C., an initial thin layer of only 0.2 nm has been formed. At 250° C., the LiF thickness has almost reached its full thickness, being 1 nm or more. At 350° C., the LiF layer has reached its full thickness and PVDF has been fully consumed. These results were comparable to thicknesses obtained from Fluor ion chromatography. Example 10 gives strong evidence that at sufficient high temperature—about 50° C. above the melting point—the polymer starts reacting with the surface base and a protective LiF film is formed by consuming and replacing the surface base.

TABLE 10

Overview of apparent atomic concentrations (at %) measured at the surface after deconvolution of the C 1s, F 1s and Li 1s spectra into their different contributions.

| | C 1s | | | | | F 1s | | Li 1s | | LiF |
|---|---|---|---|---|---|---|---|---|---|---|
| | | | | eV | | | | | | |
| Sample | 284.8 C—H | 286.7 C—O | 288.2 —C=O | 289.7 —$CO_3$ | 292 $CF_2$—$CF_2$ | 687.5 F-org | 684.7 LiF | 55.1 $Li^+$ | $Li^+$/LiF ratio | thickness (nm) |
| 150° C. | 10.0 | 2.3 | / | 10.2 | 0.4 | 5.3 | 2.0 | 14.8 | 7.4 | 0.2 |
| 250° C. | 14.8 | 5.2 | / | 7.6 | 0.5 | 11.9 | 8.3 | 11.5 | 1.4 | 1.0 |
| 350° C. | 12.2 | 1.3 | 1.2 | 1.6 | / | / | 14.6 | 14.8 | 1.0 | 1.3 |

"/" stands for absence of an XPS peak.

Conclusions for Table 10:

1 C 1s:

1.1 Based on the absence of $CF_2$—$CF_2$ peaks we can conclude that most of the PVDF is removed by the solvent wash. Especially at T=350° C. no PVDF is Based on the results of Examples 1 to 10 it can be concluded that an effective LiF film should have a thickness of at least 0.5 nm (extrapolated value at >200° C.), and preferably 0.8 nm (extrapolated value at >225° C.).

The invention can alternatively be described by the following clauses:

1. A lithium transition metal oxide powder for use in a rechargeable battery, wherein the surface of the primary particles of the powder is coated with a first inner and a second outer layer, the second outer layer comprising a fluorine-containing polymer, and the first inner layer consisting of a reaction product of the fluorine-containing polymer and the primary particle surface.

2. The lithium transition metal oxide powder of clause 1, wherein the reaction product is LiF, wherein the lithium originates from the primary particles' surface.

3. The lithium transition metal oxide powder of clause 2, wherein the fluorine in the reaction product LiF originates from partially decomposed fluorine-containing polymer present in the outer layer.

4. The lithium transition metal oxide powder of any one of clauses 1 to 3, wherein the fluorine-containing polymer is selected from the group consisting of PVDF, PVDF-HFP, and PTFE.

5. The lithium transition metal oxide powder of any one of clauses 1 to 4, wherein the fluorine-containing polymer is composed of agglomerated primary particles having an average particle size of between about 0.2 and about 0.5 μm.

6. The lithium transition metal oxide powder of any one of clauses 1 to 5, wherein the lithium transition metal oxide is selected from the group consisting of:
    $LiCO_dM_eO_2$, wherein M is either one or both of Mg and Ti, with $e<0.02$ and $d+e=1$;
    $Li_{1+a}M'_{1-a}O_{2\pm b}M^1{}_k\ S_m$ with $-0.03<a<0.06$, $b<0.02$, wherein M' is a transition metal compound, wherein at least 95% of M' are selected from the group consisting of Ni, Mn, Co, Mg and Ti; $M^1$ consisting of either one or more elements of the group Ca, Sr, Y, La, Ce and Zr, with $0 \le k \le 0.1$ in wt %; and $0 \le m \le 0.6$, m being expressed in mol %; and
    $Li_aNi_xCo_yM''_zO_{2\pm e}A_f$, with $0.9<a'<1.1$, $0.5 \le x \le 0.9$, $0<y \le 0.4$, $0<z \le 0.35$, $e<0.02$, $0 \le f \le 0.05$ and $0.9<(x+y+z+f)<1.1$; M'' consisting of either one or more elements from the group Al, Mg, and Ti; A consisting of either one or both of S and C.

7. The lithium transition metal oxide powder of clause 6, wherein $M'=Ni_{a''}Mn_{b''}Co_{c''}$, with $a''>0$, $b''>0$, $c''>0$ and $a''+b''+c''=1$; and $a''/b''>1$.

8. The lithium transition metal oxide powder of clause 7, wherein $0.5 \le a''0.7$, $0.1<c''<0.35$, and $a''+b''+c''=1$.

9. The lithium transition metal oxide powder of any one of clauses 1 to 8, wherein the first inner layer consists of a LiF film with a thickness of at least 0.5 nm.

10. The lithium transition metal oxide powder of any one of clauses 1 to 9, wherein the first inner layer consists of a LiF film with a thickness of at least 0.8 nm 11. The lithium transition metal oxide powder of any one of clauses 1 to 10, wherein the first inner layer consists of a LiF film with a thickness of at least 1 nm.

12. A method for covering a lithium transition metal oxide powder with a fluorine containing double-layered coating, the method comprising:
    providing a bare lithium transition metal oxide powder,
    mixing the bare lithium transition metal oxide powder with a fluorine-containing polymer to form a powder-polymer mixture, and
    heating the powder-polymer mixture at a temperature of between at least 50° C. and at most 140° C. above the melting temperature of the fluorine-containing polymer, whereby, on the surface of the metal oxide powder a double-layered coating is formed, consisting of an outer layer consisting of the fluorine-containing polymer, and an inner layer consisting of a reaction product of the powder surface and the polymer.

13. The process according to clause 12, wherein the amount of fluorine-containing polymer in the powder-polymer mixture is between 0.1 and 2 wt %.

14. The process according to any one of clauses 12 or 13, wherein the amount of fluorine-containing polymer in the powder-polymer mixture is between 0.2 and 1 wt %.

15. The process according to clauses 12 or 13, wherein the inner layer consists of LiF.

16. The process according to any one of clauses 12 to 15, wherein the fluorine-containing polymer is a PVDF, and the powder-polymer mixture is heated at a temperature between 220 and 325° C. for at least one hour.

17. The process according to any one of clauses 12 to 15, wherein the fluorine-containing polymer is a PVDF, and the powder-polymer mixture is heated at a temperature between 240 and 275° C.

18. The process according to any one of clauses 12 to 17, wherein the lithium transition metal oxide is either one of
    $LiCO_dM_eO_2$, wherein M is either one or both of Mg and Ti, with $e<0.02$ and $d+e=1$;
    $Li_{1+a}M'_{1-a}O_{2\pm b}M^1{}_k\ S_m$ with $-0.03<a<0.06$, $b<0.02$, wherein M' is a transition metal compound, wherein at least 95% of M' consists of either one or more elements of the group Ni, Mn, Co, Mg and Ti; $M^1$ consisting of either one or more elements of the group Ca, Sr, Y, La, Ce and Zr, with $0 \le k \le 0.1$ in wt %; and $0 \le m \le 0.6$, m being expressed in mol %; and
    $Li_aNi_xCO_yM''_zO_{2\pm e}A_f$, with $0.9<a'<1.1$, $0.5 \le x \le 0.9$, $0<y \le 0.4$, $0<z \le 0.35$, $e<0.02$, $0 \le f \le 0.05$ and $0.9<(x+y+z+f)<1.1$; M'' consisting of either one or more elements from the group Al, Mg, and Ti; A consisting of either one or both of S and C.

19. The process according to clause 18, wherein $M'=Ni_{a''}Mn_{b''}Co_{c''}$, with $a''>0$, $b''>0$, $c''>0$ and $a''+b''+c''=1$; and $a''/b''>1$.

20. The process according to clause 19, wherein $0.5 \le a'' \le 0.7$, $0.1<c''<0.35$, and $a''+b''+c''=1$.

21. The process according to any one of clauses 12 to 20, wherein the inner layer has a thickness of at least 0.5 nm.

22. The process according to any one of clauses 12 to 21, wherein the inner layer has a thickness of at least 0.8 nm.

23. The process according to any one of clauses 12 to 22, wherein the inner layer has a thickness of least 1 nm.

24. A double-shell core lithium transition metal oxide powder, comprising:
primary particles having surfaces, wherein the surfaces of the primary particles are coated with an inner and an outer layer.

25. The double-shell core lithium transition metal oxide powder of clause 24, wherein the outer layer comprises the fluorine-containing polymer.

26. The double-shell core lithium transition metal oxide powder of clause 24, wherein the inner layer comprises a reaction product of the fluorine-containing polymer and the primary particles' surfaces.

27. The double-shell core lithium transition metal oxide powder of clause 24, wherein the surfaces of the primary particles are fully coated.

28. The double-shell core lithium transition metal oxide powder of clause 24, wherein the primary particles are formed after precipitation and firing of a lithium transition metal oxide powder.

29. The double-hell core lithium transition metal oxide powder of clause 24, further comprising secondary particles, wherein both the primary and the secondary particles are coated.

30. The double-shell core lithium transition metal oxide powder of clause 29, wherein the primary particles are formed before the secondary particles are formed.

31. A method for covering a lithium transition metal oxide powder with a fluorine containing double-layered coating, the method:
   mixing a bare lithium transition metal oxide powder with a fluorine-containing polymer to form a powder-polymer mixture; and
   heating the powder-polymer mixture, wherein a double-layered coating is formed on the surface of the metal oxide powder 32. The method according to clause 31, wherein the double-layered coating comprises an outer layer and an inner layer.

33. The method according to clause 31, wherein the outer layer comprises the fluorine-containing polymer.

34. The method according to clause 31, wherein the inner layer comprises a reaction product of the powder surface and the polymer.

35. The method according to clause 31, wherein the powder-polymer mixture is heated at a temperature of between at least 50° C. and at most 140° C. above the melting temperature of the fluorine-containing polymer.

36. The method according to clause 31, wherein the heating of the powder-polymer mixture forms the double-shell core lithium transition metal oxide powder of clause 24.

37. The double-shell core lithium transition metal oxide powder of clause 24, wherein the double-shell core lithium transition metal oxide powder is utilized in a lithium-ion prismatic or polymer battery.

38. An LNMO/LNO cathode material, comprising: primary LNMO/LNO particles comprising a LNMO/LNO core, wherein the core is covered by a fluoride containing polymer and by a partly decomposed polymer substrate in contact with the fluoride containing polymer.

39. The LNMO/LNO cathode material of clause 38, wherein the fluoride containing polymer is LiF.

40. The LNMO/LNO cathode material of clause 38, wherein the surface of the primary LNMO/LNO particles is carbon free.

41. A method of forming a double-shell coated LNMO/LNO cathode material, the method comprising:
   combining an LNMO/LNO powder material with a fluorine-containing polymer to form a powder-polymer mixture;
   heating the powder-polymer mixture to a temperature above the melting point of the fluorine-containing polymer;
   reacting the fluorine-containing polymer with the LNMO/LNO powder material; and
   forming a double-layered coating on the LNMO/LNO powder material.

While specific embodiments and/or details of the invention have been shown and described above to illustrate the application of the principles of the invention, it is understood that this invention may be embodied as more fully described in the claims and clauses, or as otherwise known by those skilled in the art (including any and all equivalents), without departing from such principles.

The invention claimed is:

1. A rechargeable battery comprising:
   a cathode comprising a primary particle of lithium transition metal oxide powder, wherein a surface of the primary particle is coated with an inner layer and an outer layer,
   the outer layer comprises a partially decomposed fluorine-containing polymer,
   the inner layer comprises LiF with a thickness of at least 0.5 nm, and
   the surface of the primary particle is Li depleted,
   wherein the partially decomposed fluorine-containing polymer and the LiF are produced from the heating of a mixture of a bare lithium transition metal oxide powder and the fluorine-containing polymer at a temperature between 50° C. and 140° C. above the melting temperature of the fluorine-containing polymer.

2. The rechargeable battery of claim 1, wherein the fluorine-containing polymer is selected from the group consisting of PVDF, PVDF-HFP, and PTFE.

3. The rechargeable battery of claim 1, wherein the fluorine-containing polymer is composed of agglomerated primary particles having an average particle size of between about 0.2 and about 0.5 μm.

4. The rechargeable battery of claim 1, wherein the lithium transition metal oxide is selected from the group consisting of:
   $LiCo_d M_e O_2$, wherein M comprises one or both of Mg and Ti, with e<0.02 and d+e=1;
   $Li_{1+a}M'_{1-a}O_{2\pm b}M^1{}_k S_m$, with $-0.03<a<0.06$, $b<0.02$, wherein M' is a transition metal compound,
   wherein at least 95% of M' are selected from the group consisting of Ni, Mn, Co, Mg and Ti;
   $M^1$ comprises one or more elements selected from the group consisting of Ca, Sr, Y, La, Ce and Zr, with $0 \le k \le 0.1$ in wt %; and $0 \le m \le 0.6$, m being expressed in mol %; and
   $Li_a Ni_x Co_y M''_z O_{2\pm e} A_f$, with $0.9<a'<1.1$, $0.5 \le x \le 0.9$, $0<y \le 0.4$, $0<z \le 0.35$, $e<0.02$, $0 \le f \le 0.05$ and $0.9<(x+y+z+f)<1.1$; M" comprises one or more elements selected from the group consisting of Al, Mg, and Ti; and A comprises one or both of S and C.

5. The rechargeable battery of claim 4, wherein $M'=Ni_{a''}Mn_{b''}Co_{c''}$, with a''>0, b''>0, c''>0 and a''+b''+c''=1; and a''/b''>1.

6. The rechargeable battery of claim 5, wherein $0.5 \le a'' \le 0.7$, $0.1<c''<0.35$, and a''+b''+c''=1.

7. The rechargeable battery of claim 1, wherein the inner layer comprises a LiF film with a thickness of at least 0.8 nm.

8. The rechargeable battery of claim 7, wherein the inner layer comprises a LiF film with a thickness of at least 1 nm.

9. A method for manufacturing a rechargeable battery comprising a cathode comprising a primary particle of lithium transition metal oxide powder, the method, comprising:
   providing a bare lithium transition metal oxide powder comprising a primary particle,
   mixing the primary particle of the bare lithium transition metal oxide powder with a fluorine-containing polymer to form a powder-polymer mixture, and
   heating the powder-polymer mixture at a temperature between 50° C. and 140° C. above the melting temperature of the fluorine-containing polymer, whereby, on a surface of the primary particle, a double-layered coating is formed, the coating comprising an inner layer and an outer layer, the outer layer comprises a partially decomposed fluorine-containing polymer, the inner layer comprises LiF with a thickness of at least 0.5 nm, and the surface of the primary particle is Li depleted.

10. The method of claim 9, wherein the amount of fluorine-containing polymer in the powder-polymer mixture is between 0.1 and 2 wt %.

11. The method of claim 10, wherein the amount of fluorine-containing polymer in the powder-polymer mixture is between 0.2 and 1 wt %.

12. The method of claim 9, wherein the inner layer comprises LiF.

13. The method of claim 9, wherein the fluorine-containing polymer is a PVDF, and the powder-polymer mixture is heated at a temperature between 220 and 325° C. for at least one hour.

14. The method of claim 13, wherein the fluorine-containing polymer is a PVDF, and the powder-polymer mixture is heated at a temperature between 240 and 275° C.

15. The method of claim 9, wherein the lithium transition metal oxide is selected from the group consisting of:

$LiCo_dM_eO_2$, wherein M comprises one or both of Mg and Ti, with $e<0.02$ and $d+e=1$;

$Li_{1+a}M'_{1-a}O_{2\pm b}M^1{}_k\ S_m$ with $-0.03<a<0.06$, $b<0.02$, wherein M' is a transition metal compound, wherein at least 95% of M' comprises one or more elements selected from the group consisting of Ni, Mn, Co, Mg and Ti; M1 comprises one or more elements selected from the group consisting of Ca, Sr, Y, La, Ce and Zr, with $0\leq k\leq 0.1$ in wt %; and $0\leq m\leq 0.6$, m being expressed in mol %; and $Li_aNi_xCo_yM''_zO_{2\pm e}\ A_f$, with $0.9<a'<1.1$, $0.5\leq x\leq 0.9$, $0<y\leq 0.4$, $0<z\leq 0.35$, $e<0.02$, $0\leq f\leq 0.05$ and $0.9\ (x+y+z+f)<1.1$; M" comprising one or more elements selected from the group consisting of Al, Mg, and Ti; and A comprises one or both of S and C.

16. The method of claim 15, wherein $M'=Ni_{a''}Mn_{b''}Co_{c''}$, with $a''>0$, $b''>0$, $c''>0$ and $a''+b''+c''=1$; and $a''/b''>1$.

17. The method of claim 16, wherein $0.5\leq a''\leq 0.7$, $0.1<c''<0.35$, and $a''+b''+c''=1$.

18. The method of claim 9, wherein the inner layer has a thickness of at least 0.8 nm.

19. The method of claim 18, wherein the inner layer has a thickness of least 1 nm.

* * * * *